(12) United States Patent
Zhang

(10) Patent No.: US 11,799,701 B2
(45) Date of Patent: *Oct. 24, 2023

(54) ZCNET—POWER WIDE AREA NETWORK (LPWAN) CODE DIVISION MULTIPLEXING (CDM) AND MODULATION SYSTEM, PROCESS, COMPUTER PROGRAM PRODUCT, AND CIRCUITRY

(71) Applicant: THE FLORIDA STATE UNIVERSITY RESEARCH FOUNDATION, INC., Tallahassee, FL (US)

(72) Inventor: Zhenghao Zhang, Tallahassee, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/888,464

(22) Filed: Aug. 15, 2022

(65) Prior Publication Data
US 2022/0393917 A1      Dec. 8, 2022

Related U.S. Application Data

(63) Continuation of application No. 16/894,912, filed on Jun. 8, 2020, now Pat. No. 11,418,373.
(Continued)

(51) Int. Cl.
*H04W 4/00*     (2018.01)
*H04L 27/12*    (2006.01)
(Continued)

(52) U.S. Cl.
CPC ............. *H04L 27/12* (2013.01); *H04J 13/00* (2013.01); *H04L 12/2854* (2013.01); *H04W 48/12* (2013.01)

(58) Field of Classification Search
CPC ..... H04L 5/0019; H04L 5/0044; H04L 27/12; H04L 12/2854; H04L 27/26;
(Continued)

(56) References Cited

U.S. PATENT DOCUMENTS 7,773,664 B2    8/2010  Myers
8,243,837 B2 *  8/2012  Iwai ................... H04J 13/0062
                                                         375/260
(Continued)

FOREIGN PATENT DOCUMENTS

EP          2763321 B1      8/2014

OTHER PUBLICATIONS

Texas Instruments, Random Access Preamble L1 Parameters in E-UTRA, 3GPP TSG RAN WG1 #49 R1-072192, 4 pages, May 11, 2007.*
(Continued)

*Primary Examiner* — Frank Duong
(74) *Attorney, Agent, or Firm* — FisherBroyles LLP; Anthony Dovale

(57) ABSTRACT

A novel LPWAN technology includes a ZCNET node that transmit signals that occupy a very small fraction of the signal space, resulting in very low collision probabilities. ZCNET supports parallel root channels within a single frequency channel by using Zadoff-Chu (ZC) root sequences. The root channels do not severely interfere with each other, because the interference power is spread evenly over the entire signal space. ZCNET has its node randomly choose the transmission channel and range, while still achieving high packet receiving ratios such as 0.9 or above, because the load in each root channel is small.

20 Claims, 14 Drawing Sheets

Related U.S. Application Data

(60) Provisional application No. 62/858,435, filed on Jun. 7, 2019.

(51) Int. Cl.
*H04L 12/28* (2006.01)
*H04J 13/00* (2011.01)
*H04W 48/12* (2009.01)

(58) Field of Classification Search
CPC . H04L 27/2656; H04L 27/2657; H04L 27/34; H04J 13/00; H04J 11/0023; H04J 13/0059; H04J 13/0062; H04J 13/0074; H04W 74/0825; H04W 48/12; Y02D 30/70
See application file for complete search history.

(56) References Cited

U.S. PATENT DOCUMENTS

| | | | |
|---|---|---|---|
| 9,294,245 | B2* | 3/2016 | Qu .................. H04W 88/02 |
| 11,147,105 | B2* | 10/2021 | Han .................. H04W 74/008 |
| 2009/0268666 | A1* | 10/2009 | Vujcic .............. H04W 74/0833 |
| | | | 370/328 |
| 2010/0105405 | A1* | 4/2010 | Vujcic .................. H04J 13/22 |
| | | | 455/452.1 |
| 2010/0284350 | A1 | 11/2010 | Korhonen |
| 2014/0219329 | A1 | 8/2014 | Seller |
| 2019/0349426 | A1 | 11/2019 | Smith |
| 2021/0022117 | A1 | 1/2021 | Yi |

OTHER PUBLICATIONS

3GPP TS 36.101. User Equipment (UE) Radio Transmission and Reception. 3rd Generation Partnership Project; Technical Specification Group Radio Access Network. Evolved Universal Terrestrial Radio Access (EUTRA).
3GPP TS 36.104. Base Station (BS) radio transmission and reception. 3rd Generation Partnership Project; Technical Specification Group Radio Access Network. Evolved Universal Terrestrial Radio Access (EUTRA).
Ettus Research. https://www.ettus.com/all-products/ub210-kit/, Jun. 1, 2019.
Gnu radio. http://gnuradio.org/, Jun. 1, 2019.
LoRaWAN 1.1 specification. https://www.lora-alliance.org/ resourcehub/ lorawantm-spec!fication-v11, Jun. 1, 2019.
NB-IoT. http:/www.3gpp.org/news-events/3gpp-news/1785-nb iot complete, Jun. 1, 2019.
RPMA Technology. https:/www.ingenu.com/technology/rpma. Jun. 1, 2019.
Sigfox. https://www.sigfox.com, Jun. 1, 2019.
Weightless Specification. http://www.weightless.org/aboutlweightlessspecification, Jun. 1, 2019.
Floris Van Den Abeele, Jetmir Haxhibeqiri, Ingrid Moerman, and Jeroen Hoebeke. Scalability analysis of large-scale lorawan networks in ns-3. IEEE Internet of Things Journal, 4(6):2186-2198, 2017.
Ferran Adelantado, Xavier Vilajosana, Pere Tuset-Peir'o, Borja Martinez, Joan Meli'a-Segu'i, and Thomas Watteyne. Understanding the limits of lorawan. IEEE Communications Magazine, 55(9):34-40, 2017.
"Wireless LAN Medium Access Control (MAC) and Physical Layer (PHY) Specifications; Amendent 2: Sub 1 GHz License Exempt Operations", IEEE P802.11-TASK Group AH. http://www.ieee802. org/11/Reports/tgah update htm, Dec. 7, 2016.
Godfrey Anuga Akpakwu, Bruno J. Silva, Gerhard P. Hancke, and Adnan M. Abu-Mahfouz. A survey on 5g networks for tile internet of things: Communication technologies and challenges. IEEE Access, 6:3619-3647, 2018.
Ala I. Al-Fuqaha, Mohsen Guizani, Mehdi Mohammadi, Mohammed Aledhari, and Moussa Ayyash. Internet of things: A survey on enabling technologies, protocols, and applications. IEEE Communications Surveys and Tutorials, 17(4):234 7-2376, 2015.
Guillerrmo E. Atkin and Kai-San L. Fung. Coded multipulse modulation in optical communication systems. IEEE Trans. Communications, 42(234):574-582, 1994.
Aloys Augustin, Jiazi Yi, Thomas H. Clausen, and William Mark Townsley. A study of lora: Long range & low power nhetworks for the internet of things. Sensors, 16(9): 1466, 2016.
Olivier Bernard, Andr Seller, and Nicolas Sornin. Low power long range transmitter. EP2763321A1, 2015.
C. Berrou, A. Glavieux, and P. Thitimajshima. Near Shannon limit error correcting code and decoding- Turbo Codes (1). In IEE ICC, pp. 1064-1070, 1993.
Martin C. Bor, Utz Roedig, Thiemo Voigt, and Juan M. Alonso. Do lora low-power wide-area networks scale? In Proceedings of the 19th ACM International Conference on Modeling, Analysis and Simulation of Wireless and Mobile Systems, MSWiM 2016, Malta, Nov. 13-17, 2016, pp. 59-67, 2016.
Eleonora Borgia. The internet of things vision: Key features, applications and open issues. Computer Communications, 54: 1-31, 2014.
Kuor-Hsin Chang and Bob Mason. The IEEE 802.15.4g standard for smart metering utility networks. In IEEE Third International Conference on Smart Grid Communications, SmartGridComm 2012, Tainan, Taiwan, Nov. 5-8, 2012, pp. 476-480, 2012.
Min Chen, Yiming Miao, Yixue Hao, and Kai Hwang. Narrow band internet of things. IEEE Access, 5:20557-20577, 2017.
David C. Chu. Polyphase codes with good periodic correlation properties (corresp.). IEEE Trans. Information Theory, 18(4):531-532, 1972.
Angelika Dohr, Robert Modre-Osprian, Mario Drobics, Dieter Hayn, and Gunter Schreier. The internet of things for ambient assisted living. In Seventh international Conference on Information Technology: New Generations, ITNG 2010, Las Vegas, Nevada, USA, Apr. 12-14, 2010, pp. 804-809, 2010.
Adwait Dongare, Revatlly Narayanan, Akshay Gadre, Anll Luong, Artur Balanuta, Swarun Kumar, Bob Iannucci, and Anthony Rowe. Charm: exploiting geographical diversity through coherent combining in lowpower wide-area networks. In Proceedings of the 17th ACM/IEEE International Conference on Information Processing in Sensor Networks, IPSN 2018, Porto, Portugal, Apr. 11-13, 2018, pp. 60-71, 2018.
Rashad Eletreby, Diana Zhang, Swarun Kumar, and Osman Yagan. Empowering low-power wide area networks in urban settings. In Proceedings of the Conference of the ACM Special Interest Group on Data Communication, SIGCOMM 2017, Los Angeles, CA, USA, Aug. 21-25, 2017, pp. 309-321, 2017.
Robert L. Frank, Soiornon A Zadoff, and R. C. Heimiller. Phase shift pulse codes with good periodic correlation properties (corresp.). IRE Trans. information Theory, 8(6):381-382, 1962.
Yuichiro Fujiwara. Self-synchronizing pulse position modulation with error tolerance. IEEE Trans. Information Theory, 59(9):5352-5362, 2013.
Ying He, Jian Wang, Yongtao Su, Eryk Dutkiewicz, Xiaojing Huang, and Jinglin Shi. An efficient implementation of PRACH generator in LTE UE transmitters. In Proceedings of the 7th International Wireless Communications and Mobile Computing Conference, IWCMC 2011, Istanbul, Turkey, Jul. 4-8, 2011, pp. 2226-2230, 2011.
P. J. Marcelis, V. Rao, and R. V. Prasad. Dare: Data recovery through application layer coding for lorawan. In Proceedings of the Second International Conference on Internet-of-Things Design and Implementation, IoTDI 2017, Pittsburgh, PA, USA, Apr. 18-21, 2017, pp. 97-108, 2017.
Ubiik. LPWAN Comparison—Learn your connectivity options for IoT. https://www.ubiik.com/lpwan-comparisons, Jun. 1, 2020.
Trung Thanh Nguyen and Lutz Lampe. MPPM constellation selection for free-space optical communications. IEEE Trans. Communications, 60(3):632-636, 2012.
Trung Thanh Nguyen and Lutz H.-J. Lampe. Coded multipulse pulseposition modulation for free-space optical communications. iEEE Trans Communications, 58(4) 1036-1041, 2010.

(56) References Cited

OTHER PUBLICATIONS

Maria Rita Palattella, Mischa Dohler, Luigi Alfredo Grieco, Gianluca Rizzo, Johan Torsner, Thomas Engel, and Latif Ladid. Internet of things in the 5g era: Enablers, architecture, and business models. IEEE Journal on Selected Areas in Communications, 34(3):510-527, 2016.

Hyuncheol Park and John R. Barry. Trellis-coded multiple-pulseposition modulation for wireless infrared communications. IEEE Trans. Communications, 52(4):643-651, 2004.

Charith Perera, Chi Harold Liu, and Srimal Jayawardena. The emerging internet of things marketplace from an industrial perspective: A survey. IEEE Trans. Emerging Topics Comput., 3(4):585-598, 2015.

Charith Perera, Arkady B. Zaslavsky, Peter Christen, and Dimitrios Georgakopoulos. Context aware computing for the Internet of things: A survey. IEEE Communications Surveys and Tutorials, 16(1):414-454, 2014.

Juha Petajajarvi, Konstantin Mikhaylov, Marko Pettisalo, Janne Janhunen, and Jari H. Iinatti. Performance of a low-power wide area network based on lora technology: Doppler robustness, scalability, and coverage. IJDSN, 13(3), 2017.

Juha Petajajarvi, Konstantin Mikhaylov, Antti Roivainen, Tuomo Hanninen, and Marko Pettissalo. On the coverage of lpwans: range evaluation and channel attenuation model for lora technology. In 14th International Conference on ITS Telecommunications, ITST 2015, Copenhagen, Denmark, Dec. 2-4, 2015, pp. 55-59, 2015.

Juha Petajajarvi, Konstantin Mikhaylov, Rumana Yasmin, Matti Hamalainen, and Jari H. Iinatti. Evaluation of lora LPWAN technology for indoor remote health and wellbeing monitoring. IJWIN, 24(2):153-165, 2017.

Tara Petric, Mathieu Goessens, Loutfi Nuaymi, Laurent Toutain, and Alexander Pelov. Measurements, performance and analysis of lora fabian, a real-world implementation of LPWAN. in 27th IEEE Annual International Symposium on Personal, Indoor, and Mobile Radio Communications, PIMRC 2016, Valencia, Spain, Sep. 4-8, 2016, pp. 1-7, 2016.

Usman Raza, Parag Kulkarni, and Mahesh Sooriyabandara. Low power wide area networks: An overview. IEEE Communications Surveys and Tutorials, 19(2):855-873,2017.

Andreas Schenk and Robert F.H. Fischer. Capacity of BICM using (bi-)orthagonak signal constellations in impulse-radio ultra-wideband systems. CoRR, abs/1102.2761, 2011.

S. Sesia, I. Toufik, and M. Baker. LTE—The UMTS Long Term Evolution: From Theory to Practice. Wiley, 2 edition, 2011.

H. Sugiyama and K. Nosu. Mppm: a method for improving the band utilization efficiency in optical ppm. J. Lightwave Tech., 7(3):465-472, 1989.

Chin-Sean Sum, Mohammad Azizur Rahman, Liru Lu, Furnihide Kojima, and Hiroshi Harada. On communication and interference range of IEEE 802.15.4g smart utility networks. In 2012 IEEE Wireless Communications and Networking Conference, WCNC 2012, Paris, France, Apr. 1-4, 2012, pp. 1169-1174, 2012.

Fei Tao, Ying Zuo, Li Da Xu, and Lin Zhang. Iot-based intelligent perception and access of manufacturing resource toward cloud manufacturing. IEEE Trans. Industrial Informatics, 10(2):1547-1557, 2014.

Serbulent Tozlu, Murat Senel, Wei Mao, and Abtin Keshavarzian. Wifi enabled sensors for internet of things: A practical approach. IEEE Communications Magazine, 50(6): 134-143, 2012.

Chun-Wei Tsai, Chin-Feng Lai, Ming-Chao Chiang, and Laurence T. Yang. Data mining for internet of things: A survey. IEEE Communications Surveys and Tutorials, 16(1):77-97, 2014.

Y.-P. Eric Wang, Xingqin Lin, Ansuman Adhikary, Asbjorn Grovlen, Yutao Sui, Yufei W Blankenship, Johan Bergman, and Hazhir Shokri- Razaghi. A primer on 3gpp narrowband internet of things. IEEE Communications Magazine, 55(3): 117-123, 2017.

Li Da Xu, Wu He, and Shancang Li. Internet of things in industries: A survey. IEEE Trans. Industrial Informatics, 10(4):2233-2243, 2014.

Xiaobin Yang and Abraham 0. Fapojuwo. Enhanced preamble detection for PRACH in L TE. In 2013 IEEE VVireless Communications and Networking Conference (WCNC), Shanghai, Shanghai, China, Apr. 7-10, 2013, pp. 3306-3311, 2013.

Kan ZIleng, Shaollang Zhao, Zhe Yang, Xiong Xiong, and Wei Xiang Design and implementation of lpwa-based air quality monitoring system IEEE Access, 4:3238-3245, 2016.

RPMA Technology for Internet of H1ings. https//www ingenu.com/portfolio/how-rprna-works-the-rnaking-of- rpma/, Jun. 1, 2019.

Sigfox Technical Overview. https://www.sigfox.com/en/what-sigfox/technology, pp. 1-26, May 2017.

Simulation & experimentation tools for LoRa networks. http://lora.tti.unipa.it/, Jun. 1, 2020.

Weightless-P System specification. http://www.weightless.org/about/weightless-specification, Jun. 1, 2019.

Minh-Tien Do, Claire Goursaud, and Jean-Marie Gorce. Interference Modelling and Analysis of Random FDMA schemes in Ultra Narrowband Networks. In Tile Tenth Advanced International Conference on Telecommunications (AICT), pp. 132-136,2014.

Powder (the Platform for Open Wireless Data-driven Experimental Research). https://powderwireless.net/, Jun. 1, 2020.

Simulation & experimentation tools for LoRa networks. http://lora.tti.unipa.it/, Jun. 1, 2019.

Daniele Croce, Michele Gucciardo, Stefano Mangione, Giuseppe Santaromita, and Ilenia Tinnirello. impact of lora imperfect orthogonality Analysis of link-level performance. IEEE Communications Letters, 22(4):796-799, 2018.

Zhang, ZCNET: Achieving High Capacity in Low Power Wide Area Networks, IEEE, 9 pages, 2020.

Roth et al., The Physical Layer of Low Power Wide Area Networks: Strategies, Information Theory's Limit and Existing Solutions, downloadable at https://hal.archives-ouvertes.fr/hal-01872023, 29 pages, Sep. 11, 2018.

Chafii et al., Enhanced PHY for Cellular Low power communication IoT, EPHYL IoT waveforms, 44 pages, Mar. 2018.

Elsaadany et al., Cellular LTE—A Technologies for the Future Internet-of-Things: Physical Layer Features and Challenges, IEEE, 28 pages, 2017.

* cited by examiner

ZCNET—POWER WIDE AREA NETWORK (LPWAN) CODE DIVISION MULTIPLEXING (CDM) AND MODULATION SYSTEM, PROCESS, COMPUTER PROGRAM PRODUCT, AND CIRCUITRY

CROSS-REFERENCE TO RELATED APPLICATIONS

The present application claims priority to and is a continuation of U.S. patent application Ser. No. 16/894,912, entitled "ZCNET—LOW POWER WIDE AREA NETWORK (LPWAN) CODE DIVISION MULTIPLEXING (CDM) AND MODULATION SYSTEM, PROCESS, COMPUTER PROGRAM PRODUCT, AND CIRCUITRY," filed Jun. 8, 2020, which claims benefit of U.S. Provisional Patent Application No. 62/858,435, entitled "ZCNET—LOW POWER WIDE AREA NETWORK (LPWAN) CODE DIVISION MULTIPLEXING (CDM) AND MODULATION SYSTEM, PROCESS, COMPUTER PROGRAM PRODUCT, AND CIRCUITRY," filed Jun. 7, 2019, the entireties of which are incorporated herein by reference.

BACKGROUND

Field of the Invention

This invention relates to modulation and code division multiplexing techniques, in particular for use in low power wide area networks.

Description of Related Art

Internet of Things technologies work to provide a system of interrelated computing devices, mechanical, and digital machines, which can be provided with a unique identifier (UID), the ability to transfer data over a network without requiring human-to-human or human-to-computer interaction. Some use cases can be accomplished by integrating low power and low data compared to other technologies, such as WLAN. Typically, low power wide area network (LPWAN) technologies are designed for data rates of up to 50,000 bits/second, for a communication coverage range from a few kilometers to 10,000 meters, and for a battery life up to 20 years. Existing LPWAN technologies provide some solutions but fail to provide the achieved goals of LPWAN while also providing adequate capacity with increased node handling with similar or less resources.

Many LPWAN technologies have emerged in recent years, among which LoRa appears to have attracted most attention. ZCNET has been compared with LoRa and has exhibited higher performance. Sigfox supports packet size up to 12 bytes, and may not optimal for certain applications. Weightless-W/N/P were proposed by the Weightless Special Interest Group; however, according to Ubiik, a leading Weightless hardware manufacturer, LoRa still has advantage in the communication range. Other technologies, such as RPMA, IEEE 802.11ah, and IEEE 802.15.4g, all still have an uphill battle competing against LoRa. ZCNET can work in the unlicensed band and is different from those designed for the licensed band, such as NB-IoT, EC-GSM and eMTC. ZC sequence has been used and proven in LTE networks, such as in the PRACH for initiating a connection. ZCNET has to address new challenges of modulating the ZC sequences for data communications in the low SNR regime, noting that the ZC sequence does not modulate data in PRACH. The modulation in ZCNET bears some similarities with Multi-Pulse Position Modulation (MPPM) in optical communications. The main difference is that ZCNET decodes the peaks from many nodes at random locations, while MPPM only considers a one-to-one link.

There has been work on improving the capacity of LoRa, the most relevant appearing to be Chorus, which decodes simultaneous packets from multiple nodes by identifying the peaks based on features such as the carrier frequency offset. Chorus achieves impressive capacity gains over the original LoRa, however the capacity is still significantly lower than ZCNET, because its performance starts to deviate from the ideal when the number of nodes is 4-5, while ZCNET can support much more simultaneous transmissions, such as over 40, while still keeping the packet receiving ratio above 0.9. This is, of course, not to diminish the contribution of Chorus, because ZCNET is a clean-slate design, while Chorus has to function within the limitations of LoRa.

There is a need for an improved modulation and multiplexing technique which can achieve improved capacity using similar or less resources.

BRIEF SUMMARY

A node device comprising circuitry configured to: execute a transmission procedure without transmission instruction from an access point and without consideration of a channel of a frequency band transmission of at least one other node that is communicatively coupled to the access point, wherein the at least one other node and the node can transmit to the access point using the same frequency band, the frequency band having a plurality of available parallel root channels associated to it, wherein the node and the other node can simultaneously transmit on a different parallel root channel of the same frequency band; wherein determining the transmission procedure includes: randomly selecting a root channel from the plurality of available root channels of the frequency band; randomly selecting a small number of consecutive points of a signal vector, from the selected root channel location for transmission of a packet; sending the packet by transmitting peaks at the selected location, the peaks transmitted by sending a sum of signal vectors for the selected peak locations.

An access point device comprising control circuitry configured to: detect a signal from a frequency band used by a first node amongst a plurality of nodes, wherein the signal from the first node uses the same frequency band as a signal from a second node, the frequency band having a plurality of available parallel root channels associated to it, wherein the first node and the second node can simultaneously transmit on a different parallel root channel of the same frequency band, the signal including a randomly selected root channel from the plurality of available root channels of the frequency band, the signal received at a subset range in a range of the signal vector of the root channel; and receive a packet via the signal by detecting peaks at the selected location, the peaks detected by receipt of a signal vector at the selected root channel location.

A data modulation and transmission procedure comprising: selecting a random root channel for transmission of a packet; selecting a random range within a signal vector for transmission of the packet, the packet including, or consisting of, a preamble, a PHY header, followed by data; modulating the data according to a root ZC sequence with a root index of the root channel; applying FEC to the modulated data; performing a lookup to find pre-computed OFDM time-domain symbol for the selected peak locations; applying phase offset to the time-domain symbol; and taking the summation of the time-domain symbols of the individual peaks; and transmitting the modulated data.

A data modulation and transmission procedure comprising: modulating the data applying FEC to the data to generate the codewords; determining peak locations and peak phases according to the codeword; performing a lookup to find pre-computed OFDM time-domain symbol for the selected peak locations of the selected root channel; applying phase offset to the time-domain symbol; taking the summation of the time-domain symbols of the individual peaks; and transmitting the modulated data.

A data modulation and transmission apparatus comprising: means for selecting a random root channel for transmission of a packet; means for selecting a random range within a signal vector for transmission of the packet, the packet including a preamble, a PHY header, and data; means for modulating the data according to a root ZC sequence with a root index of the root channel; means for applying FEC to the modulated data; means for performing a lookup to find pre-computed OFDM time-domain symbol for the selected peak locations; means for applying phase offset to the time-domain symbol; and means for taking the summation of the time-domain symbols of the individual peaks; and means for transmitting the modulated data.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION

Figure 1A:
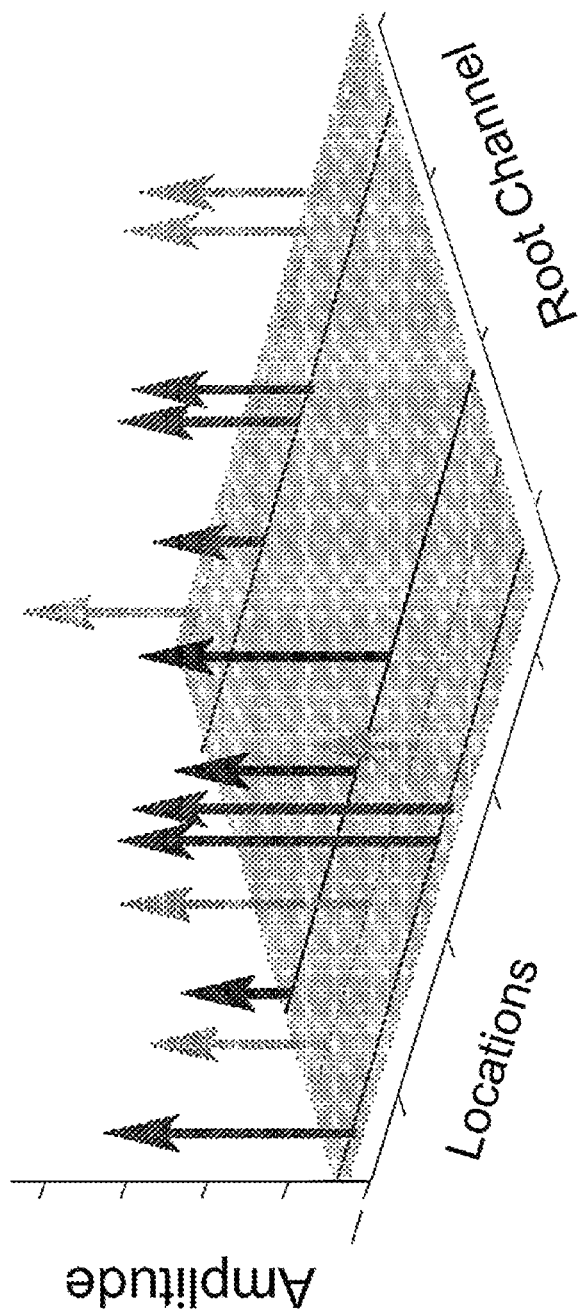
FIG. 1A illustrates a high-level overview of example placement of peaks in one or more parallel root channels in accordance with an embodiment of a Zadoff-Chu (ZC) Network (ZCNET).

As used herein, an element or step recited in the singular and proceeded with the word "a" or "an" should be understood as not excluding plural elements or steps, unless such exclusion is explicitly recited. Furthermore, references to "an embodiment" of the present invention are not intended to be interpreted as excluding the existence of additional embodiments that also incorporate the recited features.

The methods and systems described herein can be implemented using computer programming or engineering techniques including computer software, firmware, hardware or any combination or subset thereof, wherein the technical effects can include at least one of the embodiments described herein.

This invention includes embodiments described in the provisional application, "ZCNET Low Power Wide Area Network (LPWAN) Code Division Multiplexing (CDM) and Modulation System, Process, Computer Program Product, and Circuitry," by Zhenghao Zhang et al., filed Jun. 7, 2019, incorporated by reference herein in its entirety.

Described herein are improvements to LPWAN technology, including a new use of Zadoff-Chu (ZC) sequences that provide a new LPWAN technology described herein as a Zadoff-Chu (ZC) Network or "ZCNET." Advantages over existing LPWAN technologies include that some embodiments of ZCNET can achieve over 40 times the network capacity of LoRa while using similar or less resources. The capacity boost of ZCNET is due to two main features.

First, a ZCNET node transmits signals that occupy a fraction, such as a very small fraction, of the signal space, resulting in lower collision probabilities than when not using the herein disclosed method of using Zadoff-Chu (ZC) root sequences. Second, ZCNET supports a number (e.g., 8) of parallel root channels within a single frequency channel by using a number (e.g., 8) Zadoff-Chu (ZC) root sequences. The root channels do not severely interfere with each other, because the interference power is spread evenly over the entire signal space. The signal space refers to the signal vectors of all root channels. ZCNET uses a simple ALOHA-style protocol for medium access, with which a node randomly chooses the transmission channel and range, while still achieving high packet receiving ratios, such as 0.9 or above, because the load in each root channel is small. ZCNET has been extensively tested with both real-world experiments on the USRP and simulations. ZCNET can be implemented using Universal Software Radio Peripheral (USRP). The USRP product family is intended to be a comparatively inexpensive hardware platform for software radio. ZCNET has the capability to better accommodate the explosive growth of IoT network sizes and meet the demand of IoT applications.

Internet of Things (IoT) applications may critically depend on the Low-Power Wide-Area Network (LPWAN) to connect an extreme number of devices to the Internet, which is very challenging, because the communication distance may be long, while the devices are expected to run on a single battery for years. Currently, LoRa appears to have attracted most attention for unlicensed band networks.

Disclosed herein is a new LPWAN technology, ZCNET, which can also work in the unlicensed band, and has embodiments which can achieve 40 times the capacity of LoRa with use of similar or less resources. A novel LPWAN technology is disclosed herein, which can achieve much higher capacity than LoRa with use of similar or less resources. For example, Table 1 shows a head-to-head comparison with LoRa under the most challenging channel conditions, under which the most robust Modulation and Coding Schemes (MCS) should be used, namely Spreading Factor (SF) 12 for LoRa and MCA A for ZCNET. It can be seen that the capacity of ZCNET is over 40 times of LoRa, when the Signal to Noise Ratio (SNR) is the same, while ZCNET occupies less bandwidth and supports a higher Physical (PHY) layer data rate.

TABLE 1

Comparison between LoRa SF 12 and ZCNET MCS A

| | Bandwidth (kHz) | SNR (dB) | PHY Rate (Kbps) | Capacity (Kbps) |
|---|---|---|---|---|
| LoRa | 125 | −20 | 0.209 | <0.209 |
| ZCNET | 120 | −20 | 0.237 | >8.42 |

ZCNET can achieve high capacity because it allows, for example, tens of nodes to transmit packets simultaneously according to a simple ALOHA-style Medium Access Control (MAC) protocol without incurring high packet loss. Such a large number of simultaneous transmissions is made possible, roughly speaking, by creating a signal space much larger than that occupied by the transmitted signal.

FIG. 1A illustrates an example embodiment showing placement of peaks in one or more parallel root channels in ZCNET. Arrows in the same grayscale represent peaks in the same root. In ZCNET, transmissions on a particular root channel does not cause severe interferences to others, because the interference energy can be spread fairly evenly on the entire signal vector, while the total amount of interference energy is low as LPWAN nodes have very low signal power. Within a single root channel, the peak or peaks from a node are confined in a small range of length, e.g., 4. Therefore, multiple nodes can transmit on the same channel without interfering with each other, if their ranges do not overlap.

Figure 1B:
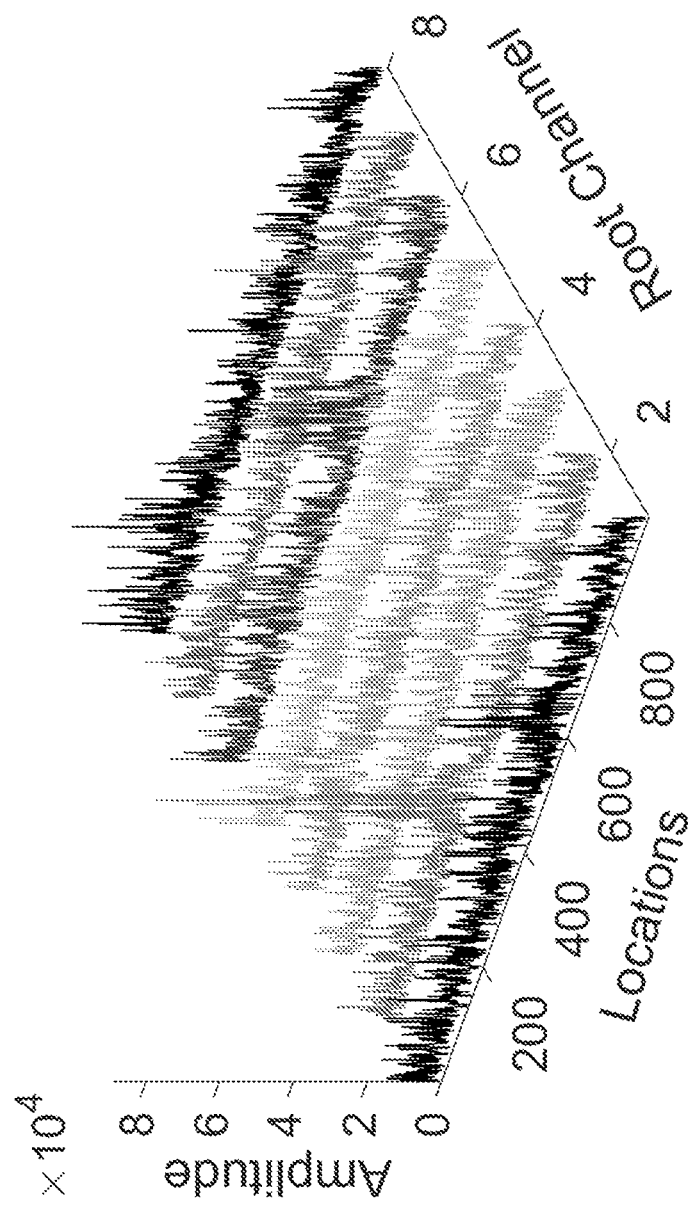
FIG. 1B illustrates an example of signal vectors of eight root channels derived from a single time symbol in accordance with an embodiment of ZCNET.

In an example embodiment illustrated in FIG. 1B, in ZCNET, data is modulated on the Zadoff-Chu (ZC) sequence, which also inspired the name of ZCNET. A transmitted ZC sequence results in a peak in the received signal vector. In ZCNET, each node limits its peaks within a very small range, such as 4, while the length of the signal vector is, for example, 983. As a result, a node does not interfere with other nodes with high probability. In addition, ZCNET supports a number (e.g., 8) parallel root channels in a single frequency channel, where each root channel can host multiple nodes simultaneously and cause small interference to other root channels. This is because ZC sequences derived from a particular root appears as flat noise to other roots, i.e., the energy will be spread out almost evenly. Therefore, LPWAN nodes, which operate in the low SNR regime, cause low interference to nodes in other root channels. ZCNET has been extensively tested with both real-world experiments and simulations. The results show that ZCNET can indeed decode weak signals in the real-world, and can support multiple simultaneous transmissions from many nodes, each with randomly selected root channel and range.

Other embodiments of ZCNET can be implemented using different parameter values, such as a different: length of the signal vector, number of parallel root channels, than those provided as examples herein.

Section 1: ZC Sequence Details
1.1 ZC Sequence

A ZC sequence is a complex vector with constant amplitude. Let $\Lambda^r$ be a root ZC sequence, which is a complex vector of length L, where r denotes the root index. $\Lambda^r$ can be used to generate L sequences by simply cyclic shifting. Let $\Lambda_h^r$ be $\Lambda^r$ cyclic shifted by h locations, which will be referred to as sequence h on root channel r. If a ZCNET node determines to transmit $\Lambda_h^r$ it generates an ODFDM symbol, in which L subcarriers are used to transmit FFT ($\Lambda_h^r$), FFT( ) denotes the FFT of a vector, and let FFT ($\Lambda_h^r$) denote the FFT of $\Lambda_h^r$. The receiver can extract R, which is the complex vector observed from L subcarriers in the received signal. The signal vector of root r, denoted as $S^r$, is calculated according to:

$$S_r = IFFT[R^* \circledcirc FFT(\Lambda^r)],$$

where IFFT ( ) denote the Inverse FFT of a vector, R* denotes the conjugate of R, and ⊚ denotes the pairwise multiplication of two vectors. In ideal conditions, if $\Lambda_h^r$ is transmitted, a peak should appear at a location h in $S^r$. In practice, the peak location may be shifted due to synchronization error and Carrier Frequency Offset (CFO).

The value at location n in a ZC root sequence is $$z_n = e^{-i\frac{u n(n+1)}{L}}$$

for n∈ [0, L−1], where u is a selected integer. In ZCNET, u can have a number of values, e.g., 8 values, i.e., u=1, L, 2, L−2, 3, L−2, 4, L−3, as the 8 roots. Lastly, if $S^r$ is generated by u or L−u where u>1, the elements are reordered, because a non-zero CFO will otherwise split one peak into u peaks, separated by H=L/u points. The reordering is basically to move the peaks back together: for 1≤x≤H and 1≤y≤u, $S^r_{(x-1)u+y} = S^r_{(y-1)H+x}$.

Section 2: Overview

ZCNET is explained for L=983, noting that the same design principles apply to other channel conditions by changing parameter values. Currently, ZCNET focuses on the uplink in the low SNR regime. The downlink reception is less challenging because the Access Point (AP) can use much higher transmission power.

In this disclosure, the focus is on the uplink, where a ZCNET Access Point (AP) receives packets from the ZCNET nodes.

Definitions

The main definitions are listed in the following:
  Time Symbol: The time-domain OFDM symbol.
  Signal Vector: A complex vector of length L, where, for example L=983, in an embodiment. If a node transmits sequence h, a peak will appear at location h in the signal vector under ideal conditions.
  Peak Number: The number of peaks transmitted by a node. A node can transmit multiple sequences, hence generate multiple peaks, by transmitting the summation of the time symbols of the individual sequences.
  Peak Cardinality: The number of candidate locations of a peak, i.e., the locations at which the peak may appear.
  Range: A continuous segment in the signal vector used by a node. The size of the range is the product of the peak number and the peak cardinality.

FIG. 1B illustrates an example of signal vectors of eight root channels derived from a single time symbol of an embodiment of a Zadoff-Chu (ZC) Network (ZCNET). For example, FIG. 1B shows the signal vectors of a number of, for example 8, root channels derived from a single time symbol, when there were, for example 46, active packet transmissions. A number of peaks can be seen in most signal vectors. The peak number can be 1 or as many as 12 or more, depending on the MCS. The peaks from the same node are confined in a small range.

2.1 ZCNET Nodes

For an embodiment of the ZCNET node design, the MAC layer can be an ALOHA-style protocol, i.e., the node simply picks a random root channel and a random range within the signal vector for the transmission of the packet. The packet consists of the preamble, the PHY header, followed by the data. At the PHY layer, the node can transmit one or multiple peaks in each time symbol. The data is modulated by changing the location and the phase of the peaks. For example, with MCS A, the node transmits only one peak with cardinality 4. Two bits can be modulated with the location of the peak. The phase of the peak takes one of the values in $\{0, \pi/2, \pi, 3\pi/2\}$ as the offset with respect to the phase of the peak in the last time symbol, therefore, also modulates 2 bits. Higher data rates can be achieved by transmitting more peaks. The data is encoded currently according to the Turbo code for Forward Error Correction (FEC). However, other good code encoding techniques can be used as well with little change to the features of ZCNET.

Like most networks, the node should discover the AP and learn certain key network parameters, such as the frequency channel used by the AP. In particular, a ZCNET node should learn the frequency channel, the time symbol boundary, and the time symbol index. The time symbol boundary is used to align the time symbols from multiple nodes within the tolerance level of the OFDM cyclic prefix. The time symbol index is used because a packet transmission should start at a time symbol with index that is a multiple of a number, for example 25, to simplify the packet detection in ZCNET. Such information can be learned from a beacon packet received from the AP. The cyclic prefix of the time symbol can be set to a time, for example 256 μs, to accommodate possible timing errors, drift, and large delay spread.

2.2 ZCNET Access Point (AP)

The ZCNET AP shoulders the main complexity of the network. The AP receives the composite time-domain signal, which may be the addition of the signals from tens of nodes on all root channels with no coordination. The AP must detect the packets and estimate key parameters, such as the beginning of the range, the CFO, to decode the packets.

The AP runs the same process to detect and decode packets for each root channel. The packets are detected based on the preambles. In the preamble, the node transmits one peak in each time symbol. The AP takes the summation of the preamble signal vectors, because peaks from the same packet should add up constructively and stand out as a high peak, the location of which can be used to determine the beginning of the range of the received packet. The main challenge is to cope with peaks from the ongoing packets, which are also in the signal vectors. Such peak may collide with the preamble peaks, and can stand out after the summation. Therefore, the preamble peaks are spread evenly over the signal vector, while the ranges of the ongoing packets are masked, which is explained in more details in Section 4.2, as well as the method to learn key parameters such as the CFO.

After a packet has been detected, the AP decodes the PHY header to learn the MCS and the length of the packet. When the packet transmission is completed, the signal vector values in the range of the packet are passed for decoding. After a successful decoding, all detected peaks of the received packet are masked from the signal vectors.

Section 3: Key Features of ZCNET

In this section, some embodiments including some key features and design choices of ZCNET are explained.

3.1 Low Complexity of ZCNET Nodes

The MAC layer and PHY layer complexity is kept low, because the node can actually store pre-computed time symbols for each possible peak, therefore avoiding modulating OFDM signals in real time. If the node transmits K peaks, the baseband waveform is the summation of K pre-computed time symbols. For most MCSs, K is very small, such as 4 or less. The highest K can be, for example 12, which is still reasonable. Lastly, the encoding of typical FEC codes, such as the Turbo code, is quite simple as it only involves linear operations.

3.2 Example Embodiment of Some Main PHY Parameters of ZCNET

In an embodiment of ZCNET, the signal vector length is 983, the FFT size is 1024, and the time-domain samples are taken every 8 μs. Only 983 points in the FFT output are used. Therefore, ZCNET occupies 983/1024/0.000008=120 kHz. The time symbol duration is 8.448 ms with 0.256 ms as the cyclic prefix.

3.3 Small Range

In an embodiment, the range size in ZCNET can be 48 or less, compared to the signal vector length, which can be 983. This is mainly because the peak cardinality can be 4, i.e., a peak can appear at 4 candidate peak locations. In contrast, in LoRa SF 12, the cardinality is 4096. The main benefit of a small range is that multiple nodes can transmit simultaneously on the same root channel, significantly increasing the capacity of the network.

However, with a small cardinality each peak carries much fewer bits, which may reduce the data rate. This is avoided, first, by modulating additional data on the phase of the peaks. Also, in ZCNET, each time symbol is roughly ¼ the duration of the LoRa symbol with SF 12, reaping a speed up of 4. A challenge, however, is roughly 6 dB loss in SNR, because only ¼ samples are taken. Fortunately, a smaller cardinality also relaxes the SNR requirement, because the actual signal peak has less competitors. Measuring by the probability of the actual signal peak being the highest among all candidate peak locations, it was found that for white Gaussian noise, reducing the cardinality by half reduces the SNR requirement by roughly 0.5 dB. Additionally, ZCNET employs more advanced FEC code, which further compensates for the loss of SNR.

3.4 Parallel Root Channels

ZCNET achieves high capacity in large because the parallel root channels accommodate many simultaneous transmissions without severely interfering with each other. This is made possible by exploiting the inherent property of the ZC sequence, as well as interference cancellation.

3.4.1 Coping with Weak Interference

Figure 2:
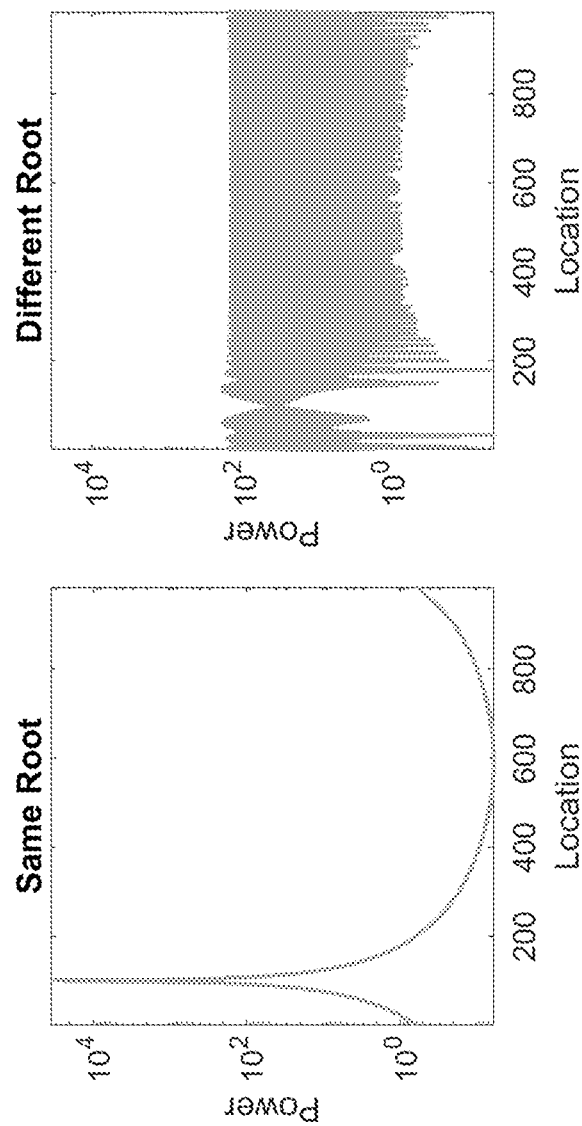
FIG. 2 illustrates an example in log scale the power of the signal vectors calculated from the same time symbol containing one peak, one with the matching root and the other with a different root in accordance with an embodiment of ZCNET.

In an embodiment of the ZC sequence, a peak in one root channel does not generate high peaks in other root channels. Instead, it only evenly raises the noise floor. For example, FIG. 2 shows in log scale the power of the signal vectors calculated from the same time symbol containing one peak, one with the matching root and the other with a different root. It can be seen that the energy is concentrated with the matching root, however is flattened and more than 2 orders of magnitude lower with the different root. Therefore, the weak nodes in ZCNET actually do not pose much challenge, because they introduce weak interference and only raise the noise floor by a small amount. For example, if the SNR of a node is −20 dB, the node only increases the noise by 1%.

3.4.2 Coping with Strong Interference

A process called SIMple Interference Cancelation (SIMIC) is used to cancel interference from strong nodes. Note that a strong signal in the matching root channel will manifest itself as a high peak, i.e., even before the data is decoded, the signal power is concentrated within a few points and can be easily identified, such as the peak in FIG. 2. Therefore, the signal around the peak can be carved out to reconstruct the time-domain signal. The reconstructed time-domain signal can be subtracted from the received time-domain signal, which will lead to a significant reduction of interference to other root channels. SIMIC is very simple, and is very different from typical interference canceling techniques, which require correctly decoded data, as well as accurate Channel State Information (CSI). Accurate CSI in the LPWAN environments can be difficult to obtain, because the channel coherence time can be comparable to the symbol time. Lastly, SIMIC only considers high peaks, because the signal distortion increases with the number of points carved out in the process.

3.5 ALOHA-Style MAC Layer

The MAC layer protocol of ZCNET is similar to ALOHA, with the clear benefit of simplicity. ZCNET can afford to use ALOHA, because the load to any single root channel is quite low with the adoption of the small range and a relatively large number of root channels. The packet loss is actually dominated by noise and remaining interference from other root channels. In addition, with the help of the FEC code, packets can often be decoded correctly even with collision, especially if the collision affects only part of the transmission.

3.6 Co-Existence of Multiple MCSs in the Same Root Channel

In ZCNET, multiple nodes can transmit at different MCSs simultaneously in the same root channel, and be received correctly, as long as their ranges do not significantly overlap. This is in contrast with LoRa, where each SF basically defines its own channel. Clearly, by decoupling the MCS from the root channel, ZCNET is more flexible in accommodating different traffic needs. For example, ZCNET can support many nodes with weak signals by spreading them to all root channels, while such nodes can only stay within the same channel with LoRa. The main challenge is to achieve high data rates, because all MCSs generate time symbols of the same duration, which is selected mainly for the lowest MCS to achieve long communication distance. ZCNET solves this problem by allowing a node to transmit multiple peaks.

Section 4: Details of ZCNET

In this section, the details of ZCNET are explained.

TABLE 2

ZCNET Modulation and Coding Schemes

| MCS | peak num. | Peak cardi. | range | FEC rate | PHY rate (kbs) |
|---|---|---|---|---|---|
| A | 1 | 4 | 4 | ½ | 0.237 |
| B | 2 | 4 | 8 | ½ | 0.473 |
| C | 4 | 4 | 16 | ½ | 0.947 |
| D | 6 | 4 | 24 | ⅔ | 1.89 |
| E | 12 | 4 | 48 | ⅔ | 3.79 |

4.1 Modulation and Coding Schemes (MCS)

ZCNET currently supports 5 MCSs by varying the number of peaks and FEC code rates. Table 2 lists the parameters of each MCS. In ZCNET, regardless of the MCS, each peak modulates 4 raw bits, 2 with location and 2 with phase. The modulation with MCS A has been explained earlier. For other MCSs, each time symbol contains multiple peaks, one of which is used as the pilot. The phase offset of any peak with respect to the pilot modulates 2 bits. The pilot itself also modulates 2 bits with phase by adding a phase offset with respect to the pilot in the previous time symbol. The codewords are interleaved to cope with bursty errors in the channel. At the receiver, the data modulated on the peak locations is decoded first, after which the locations of the actual peaks are found based on the reconstructed codeword. The phase readings are then obtained to decode the data modulated on the phase. The PHY data rate can be calculated as follows. For example, with MCS A, in each time symbol, a node transmits one peak and therefore 4 raw bits. With ½ as the FEC code rate, each time symbol carries 2 data bits. As the time symbol is 8.448 ms, the data rate is 0.237 kbps.

4.2 Packet Detection and PHY Parameter Estimation

The first step of packet decoding is to detect the packet and learn the PHY parameters, such as the CFO, which are both based on the preamble of the packet. This process faces many challenges. For example, the preamble may collide with peaks from ongoing packets. Also, as the time-domain signal maybe the mixture of many packets, traditional CFO estimation methods, which may assume that the signal is from only one packet, cannot be applied.

4.2.1 Overview:

The preamble consists of 16 time symbols, each with only one peak at a location with a known offset to the beginning of the range selected by the node. The preamble is transmitted at the beginning of a SYNC epoch, where each epoch can have, for example, 25 time symbols. Note that the SYNC epoch is not a period set aside purely for packet detection. Instead, it is simply a logical unit with 25 time symbols. The packet length need not be a multiple of the SYNC epoch length.

To detect the packets, first, the ranges of the ongoing packets, which have been detected earlier, are masked, such that they do not interfere with the packet detection process. The signal vectors are then cyclically shifted according to the offset, such that the peaks in the preamble of the same packet are aligned, i.e., should appear at the same location. The offset values are chosen such that the preamble peaks are at evenly spaced locations in the signal vector, and therefore will not consistently collide with an ongoing packet. The summation of all shifted signal vector is called the SYNC vector. The peaks in the same preamble should add up constructively, producing an aggregated SYNC peak, which should stand out even when the signal is weak. Currently, to be eligible for further packet decoding, the power of the aggregated SYNC peak should be over 16 times of the noise power in the SYNC vector. As there may be multiple new packets, the highest aggregated SYNC peak is selected first, after which the locations around the peak are masked, and the process is repeated, until there is no aggregated SYNC peak higher than the threshold. The location of the aggregated SYNC peak is clearly the beginning of the range of the node.

CFO correction includes applying a set of adjustment CFOs to the time-domain signal of the preamble, and compute a SYNC vector for each adjustment CFO. Note that the preamble peaks have the same phase if the adjustment CFO completely cancels the actual CFO; otherwise, the phases are not aligned and the peaks will likely cancel each other during the summation. Therefore, during packet detection, the selected aggregated SYNC peak is the highest peak among all SYNC vectors. Once a packet is detected based on a peak in particular SYNC vector, the adjustment CFO that produces this SYNC vector is used as the estimate of CFO of the packet.

Figure 3:
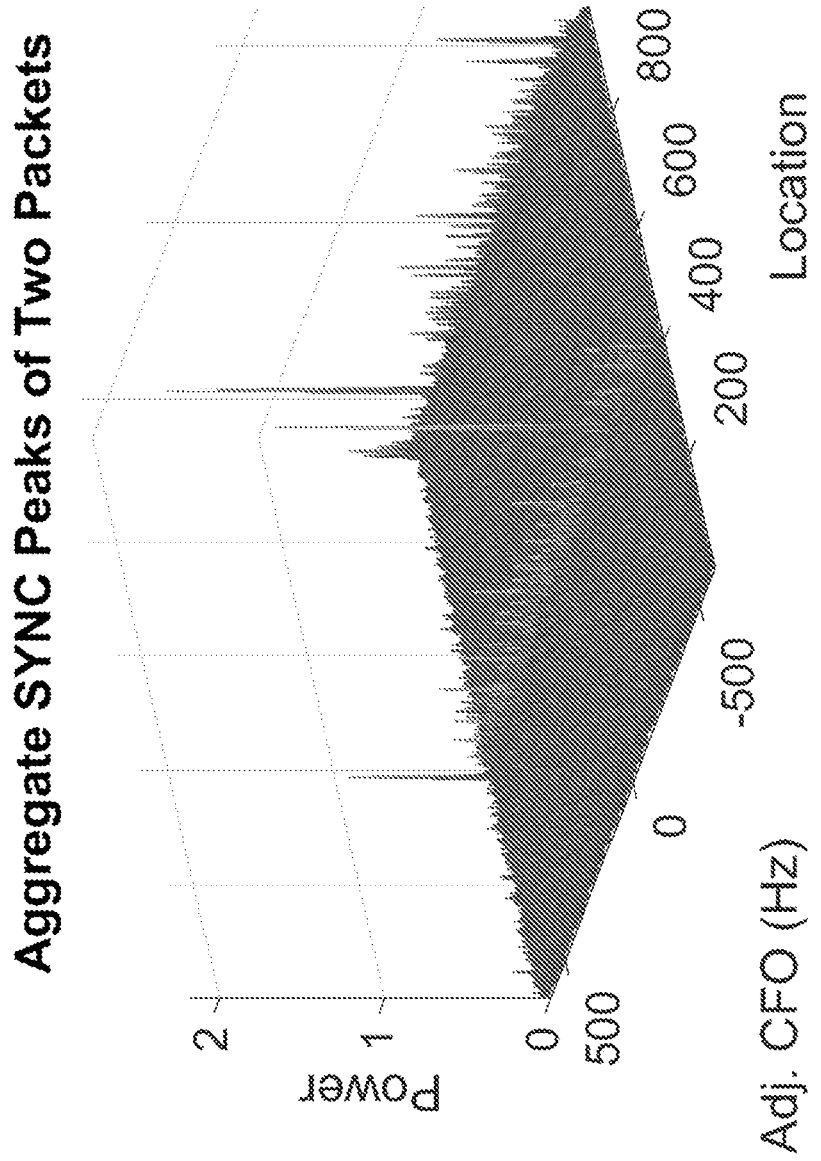
FIG. 3 illustrates an example of aggregated SYNC peaks of two packets in accordance with an embodiment of ZCNET.

For example, FIG. 3 shows the aggregated SYNC peaks of two packets. One packet is at location 387 with adjustment CFO is −383 Hz, and the other at 951 and 442 Hz.

4.2.2 Preamble Peak Offset:

Let $q_i$ be the offset of the preamble peak in time symbol i with respect to the beginning of the range. In ZCNET:

$$q_i = \left\{\frac{i(i+1)}{2M}\right\}MD, \quad (1)$$

where { } denotes the fraction part of a number, M denotes the length of the preamble, and D=61, which is the largest prime number below L/M. To see that the preamble peaks are evenly spaced, it suffices to prove that $$\left\{\frac{i(i+1)}{2M}\right\}M$$

generates unique integers in [0;M−1] with i∈[0,M−1]. Suppose this is not true, i.e., there exist distinct integers a and b, satisfying $$\left\{\frac{a(a+1)}{2M}\right\} = \left\{\frac{b(b+1)}{2M}\right\}.$$

Denote the integer parts of those inside of in the above equation for a and b as A and B, respectively, which are clearly different. As a result, $$a(a+1)−b(b+1)=(a+b+1)(|a−b|)=(A−B)2M$$

Note that there is exactly one even number among (a+b+1) and (a−b). On the other hand, 2M=32 and is greater than both (a+b+1) and (a−b), which is a contraction.

Clearly, if only to spread the preamble peaks evenly, one can simply let $q_i$=iD. The rationale behind the current solution, as well as why D is a prime number, is related to the CFO estimation, which will be explained shortly.

4.2.3 CFO Estimation:

As mentioned earlier, the basic idea is to apply a certain number of adjustment of CFO estimation is to CFOs to the time-domain signals. It was found that the preamble peak phases are mostly random when the residual CFO is not a multiple of the subcarrier spacing, leading to very low height of the aggregated SYNC peak. However, when the residual CFO is a multiple of subcarrier spacing, the height of the aggregated SYNC peak can be significantly higher. To elaborate, let the residual CFO be $\zeta\omega$, where $\zeta$ is an integer, and w is the subcarrier spacing. Consider root u where u∈[1, 4], because root L−u can be treated similarly as root u. It can be verified that, for element d in the signal vector, a residual CFO of $\zeta\omega$ will lead to a phase shift with respect to the first element by"

$$\Phi(d) = 2\pi\left[\frac{\zeta d}{Lu} - \frac{\mathrm{mod}\,(\zeta d,\,u)}{u}\right]. \quad (2)$$

The two terms in $\Phi(d)$ explain the current choice $q_i$ and D. First, if the offset of the preamble peaks is simply $q_i$=iD, clearly, the first term of $\Phi(d)$ introduces a constant phase difference of $2\pi\zeta D/(Lu)$ between consecutive peaks, which is a sinusoid. It will be matched and canceled with a certain adjustment CFO, after which the aggregated SYNC peak can be high. However, with Eq.1, the phases of the peaks is effectively randomized, and cannot be canceled by any adjustment CFO, which can only introduce a linear change to the phases. Similarly, unless $\zeta$ is a multiple of u, as D is a prime number, mod ($\zeta$qi, u) generates roughly an equal number of integers within [0, u−1], which further helps randomizing the phase values.

The adjustment CFO is from [−5ω, 5ω] at a step of 0.02ω. The range is selected with the assumption that the CFO is within ±5ω, which is basically the CFO estimation error of the nodes based on the downlink packets. It can be reduced if the estimation is more accurate. The computation complexity can also be significantly reduced by exploiting Eq.2, because the signal vectors for adjustment CFOs that differ by $\zeta\omega$ are different only by the phase values according to Eq.2 and a cyclic shift of $-\zeta$ points. Therefore, only the signal vectors of CFO in the range of [0,0.98ω] need be computed.

4.2.4 Timing-Offset (T-Off) Estimation:

To match the actual path delay at a finer granularity, ZCNET currently adopts an oversampling factor of 4, i.e., the receiver takes 4 samples for each transmitted sample. The receiver still processes 1056 samples per time symbol, however, it can pick the beginning of a time-domain symbol with an offset of 0, 1, 2, or 3, referred to as the Time-Offset (T-Off). An incorrect T-Off results in sinusoids that do not complete an integer number of cycles within L points, and lower the height of the signal peak. A simple procedure is adopted for estimating the T-Off. Basically, after the CFO has been found, the 4 possible T-Off values are applied to the time-domain signals of the preamble, and the value that generates the highest aggregated SYNC peak is used as the T-Off estimate.

4.2.5 Shortened Preamble for MCSs D and E:

The preamble length is 16, which is selected to ensure a sufficient number of observed preamble peaks and sufficient energy for packet detection. A node with better channel conditions may use shortened preamble to reduce power consumption and air time usage. Currently, for MCS D and E, only the second half of the preamble is transmitted.

4.3 PHY Header

The PHY header consists of for example 6 time symbols, which carry for example 8 bits of information, namely, the MCS and the length of the packet, as well as 4 bits of CRC. The 12 bits are encoded according to an (6,2) Reed-Solomon (RS) code on GF ($2^6$). A peak is transmitted in each time symbol, where the peak can take one of 64 locations according to the RS codeword. The range in successive symbols are cyclically shifted by an amount, for example, 163, to avoid consistently colliding with ongoing packets.

4.4 SIMple Interference Cancellation (SIMIC)

With SIMIC, each time symbol is processed individually. First, for each root, the signal vector is calculated. Peaks higher than $y\sigma$ are added to a list, where y is a constant, for example, 16, and $\sigma$ is the noise power in the signal vector. The peaks found in all roots are sorted according their power levels. Then, starting from the strongest peak, the locations within ($\beta$1)/2 points to the peak, for example where $\beta$=7, are masked in the corresponding signal vector, until the total number of masked locations in all signal vectors is above a threshold, currently for example 200, or until no peak is left. Lastly, for each root, the signal vector in the masked locations are carved out, and used to generate the time-domain signal by simply reversing the process described in the first paragraph of Section III. This time-domain signal will be subtracted from the received time-domain signal when computing the signal vectors of other roots.

4.5 E. The FEC Code in ZCNET

The performance of a wireless communication link heavily depends on the FEC code. ZCNET does not invent new FEC codes and instead uses an existing code that has been proven in practice, namely the Turbo cod. Note that the peak phases are standard QPSK, therefore, the data on peak phases are coded with the same Turbo code in LTE. The data modulated on the peak locations are coded with a customized Turbo code on GF (4). The customized code has a coding gain over the typical Turbo code on the binary field, because GF (4) represents better the location symbol, which refers to the vector of power values at 4 candidate locations of a peak, where the power value is the summation from all antennas.

In the customized code, the base convolutional code has a memory depth of 2, which are both initially 0, and generates a parity checking symbol for every data symbol received. Let so and Si be the symbols in the memory. When a new data symbol x is received, the new parity symbol y, as well as the new memory values are updated according to: $y=3x+s_0+2s_1$, $s_0=y+2x$, and $s_1=2y+3s_1$. Currently, the permutation of the data symbols to the second encoder is simply a random permutation. According to common practice, the data symbols are not punctured. The parity checking symbols are punctured periodically depending on the data rate.

The receiver converts the location symbol to probability values according to a simple heuristic, which assumes the peak power value follows the normal distribution. The mean of the power value is assumed to be the maximum power value in the location symbol. The standard deviation of the power value is approximated as the average of the location symbol, or the one fourth of the maximum value in the location symbol, whichever is smaller. The probability for each location to be the peak is calculated according to the normal distribution, and then normalized.

Section 5: Evaluation

ZCNET has been tested with USRP X310 [3] in the Powder wireless platform [6] and simulations.

5.1 Implementation

For ZCNET, the packet baseband waveforms are first generated and saved as files. In the PHY layer experiments, the transmitter USRP basically plays the files. The receiver USRP receives the signal, which is saved as files and decoded by the decoding program. For comparison, the LoRa implementation was used with some minor changes to synchronization. The FEC code rate of LoRa was 4/7. Therefore, the PHY data rates of SFs 7 to 12 were 3.91, 2.23, 1.25, 0.700, 0.384, and 0.209 kbps, respectively. The packet sizes were all 20 bytes. It has been found that larger packets results higher gains of ZCNET over LoRa.

5.2 Real-World Experiments

Real-world experiments were conducted, as described in the following.

5.2.1 Experiment Settings

Figure 4:
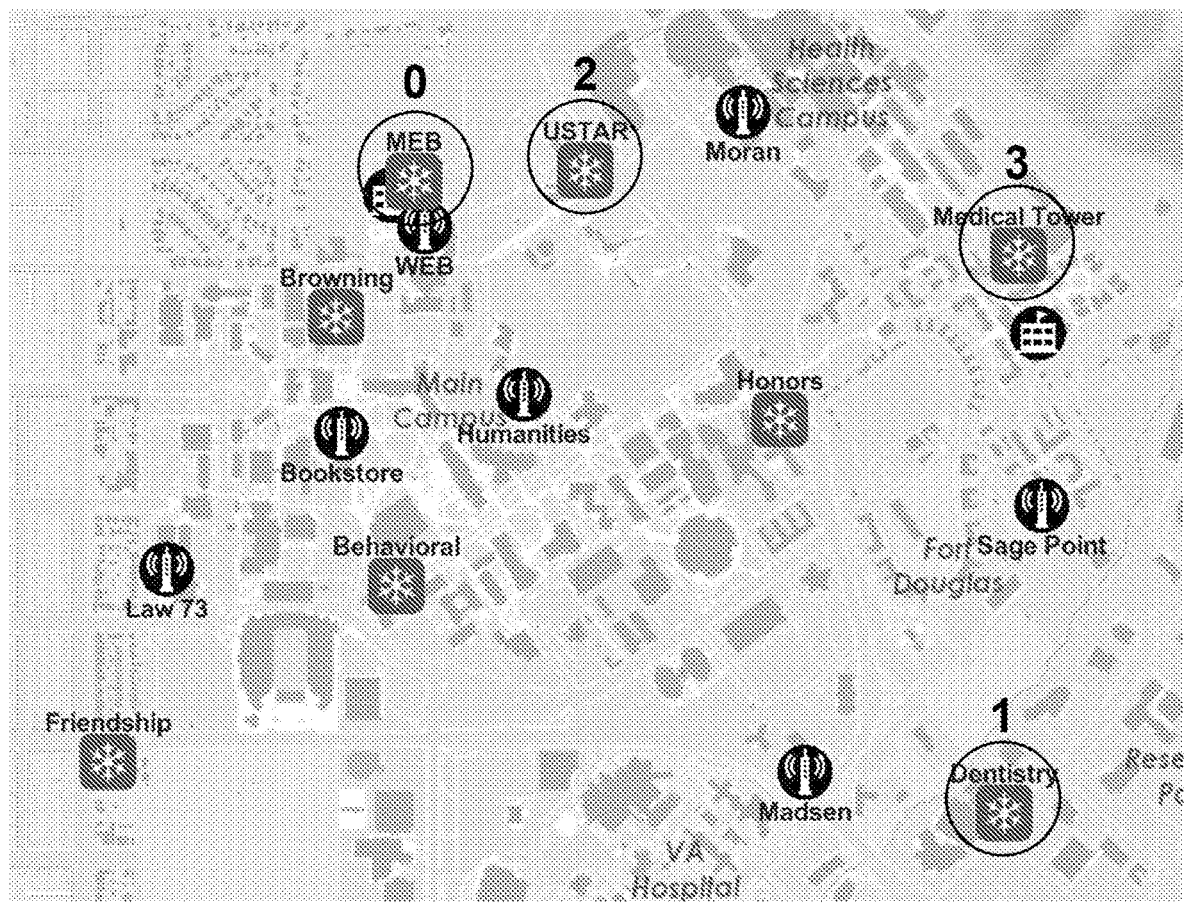
FIG. 4 illustrates one experiment with 4 rooftop radios where the locations of the radios are shown with index from 0 to 3.

The experiments were conducted with the X310 USRP [3] in the Powder wireless platform [6]. The Powder platform hosts radios that can be reserved and controlled remotely, including a number of rooftop radios, some of which were used in the experiments. The results of one experiment with 4 rooftop radios are reported in this section, where the locations of the radios are shown in FIG. 4, with index from 0 to 3.

With 4 radios, 6 links were tested, including some long links such as link 01 and link 12 that are over 2 km. For each link, 100 packets were transmitted for each ZCNET MCS, as well as LoRa SF 12 and SF 9. The carrier frequency was 3.675 GHz. The bandwidth was 500 KHz due to the minimum sampling rate limitation of X310. The transmission powers was adjusted for each link to achieve some level of connectivity, except link 01, which did not work during the experiment. The transmission power in the experiments should be less than 0 dBm.

In the experiments, LoRa decoding was relaxed, which has significantly improved its performance. That is, with LoRa, inside the same packet, some peaks are often off by just 1 position, while others are correct. With the relaxation, the peak position is still considered correct if it is off just by one. Note that the correct peak positions are known because the packets were generated offline with key information saved. It was found that without this relaxation, the Packet Receiving Ratio (PRR) can drop by over 30% even for strong links and over 60% for borderline links. ZCNET, on the other hand, should be under-performing with the experiment setting, primarily because no oversampling was applied to make sure that the comparison was with the same hardware configuration.

5.2.2 Experiment Results

Figure 5:
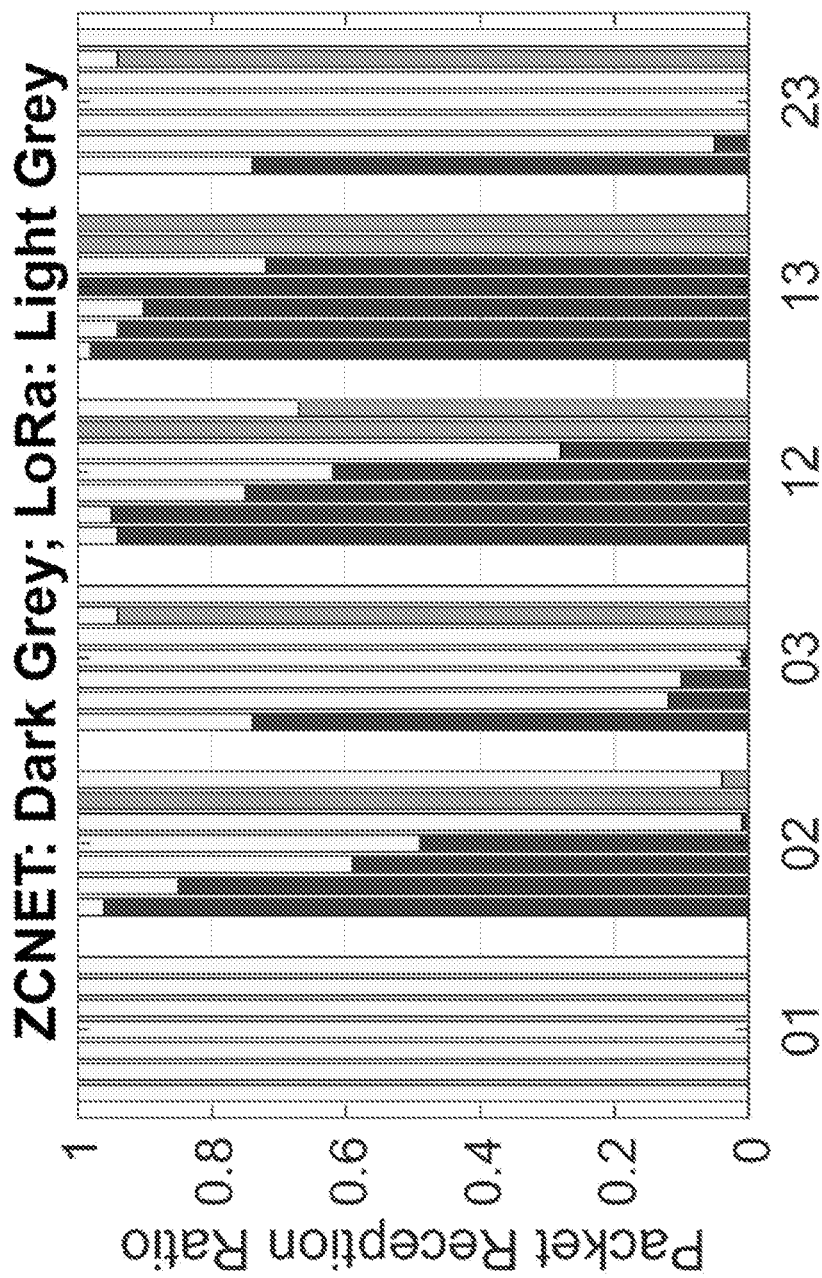
FIG. 5 illustrates Packet Receiving Ratios (PRR) of 6 experiments.

The PRRs of 6 experiments are shown in FIG. 5. It can be seen that ZCNET MCS A is close or comparable to LoRa SF 12, while ZCNET MCS D is close to or better than LoRa SF 9. For example, the PRRs of ZCNET MCS D and LoRa SF 9 on link 02 are 0.49 and 0.04, respectively. Note that the PHY data rates of ZCNET MCSs A and D are 13% and 51% higher than LoRa SFs 12 and 9, respectively. While ZCNET MCS A did report lower PRRs than LoRa MCS 12 in some of the cases, such as on links 03 and 23, the difference is only 20%, while ZCNET MCS A has a higher PHY data rate and the LoRa performance was boosted due to the relaxation mentioned earlier.

5.2.3 Discussions

The purpose of the experiments is to test the PHY layer of ZCNET with very weak signal in the real-world and compare with LoRa. The experiments were not designed as a range test, because the transmission power was not maximized, the bandwidth was not minimized, and the carrier frequency was high. The network-wide performance cannot be tested because of the small number of radios available. Lastly, the wireless medium might occasionally be filled with interference from other experiments on the same platform making it difficult to conduct a quantitative comparison.

5.2.4 Summary of Results

The experiments confirm the practicability of ZCNET on decoding weak signals in the real-world. The limitations also motivate the evaluation based on simulation to be discussed in the following.

5.3 C. ZCNET PHY Layer Comparison with LoRa

For a quantitative evaluation, simulations were conducted to find the SNR decoding thresholds of ZCNET and LoRa.

5.3.1 Simulation Setup:

In the simulation, ZCNET packets were randomly generated and passed to the LTE ETU channel model, noting that ETU has the largest delay spread in LTE channels and models challenging wireless environments. The number of receiving antennas of the model was 2. LoRa packets were similarly generated.

Figure 6:
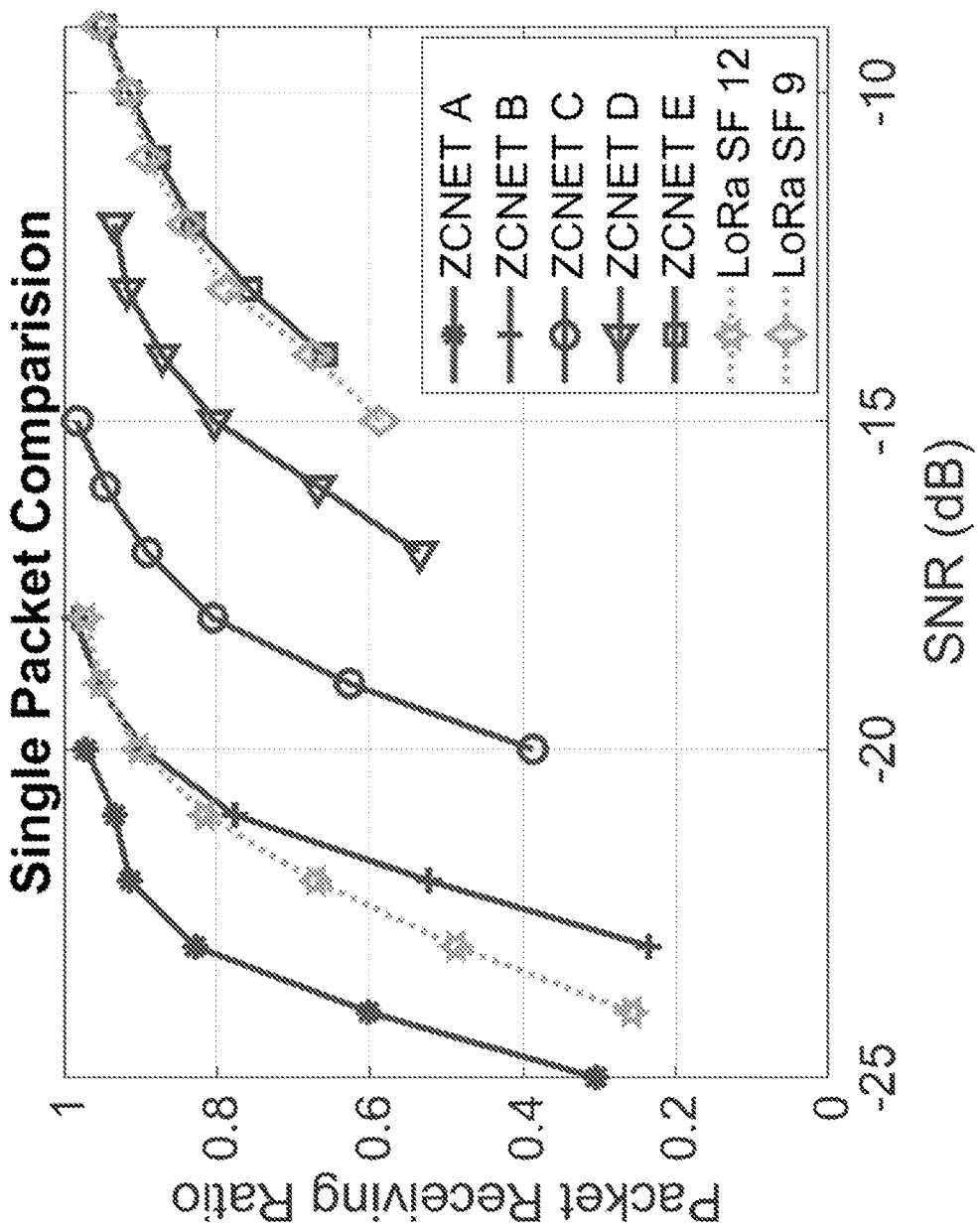
FIG. 6 illustrates PRR as a function of SNR for example MCSs of ZCNET, as well as SF 12 and SF 9 for LoRa.

5.3.2 Results:

FIG. 6 shows the PRR as a function of SNR for all MCSs of ZCNET, as well as SF 12 and SF 9 for LoRa. Not all results were included due to the limit of space in the figure. It can be seen that ZCNET has notable SNR gains over LoRa. For example, ZCNET MCS A exhibits about 2 dB gain over LoRa SF 12, even when the former has a higher data rate than the latter. Also, the curves of ZCNET MCS E and LoRa SF 9 are very close, even when the data rate of the former is over 3 times of the latter. Using 0.9 as the required PRR,

TABLE 3

SNR THRESHOLD AT 0.9 PRR

| Lora | SF 12 | SF 11 | SF 10 | SF 9 | SF 8 | SF 7 |
|---|---|---|---|---|---|---|
| SNR (dB) | −20 | −16 | −13 | −10 | −9 | −8 |
| ZCNET | A | B | C | D | E | |
| SNR (dB) | −22 | −20 | −16 | −13 | −10 | |

Table 3 shows the SNR thresholds using 0.9 as the required PRR. It can be observed that the SNR thresholds of different ZCNET MCSs are separated by about 3 dB, suggesting that the MCSs can offer options to nodes with different levels of signal powers.

5.3.3. Discussions:

The gain of ZCNET is more apparent in the simulation than in the experiments, largely due to the relaxations in LoRa experiments mentioned earlier. In addition, the ETU channel model produces much faster fluctuation and is more challenging than the channels in the experiments, where the links are between fixed antennas mounted on rooftops.

5.3.4. Summary:

The results obtained from simulations show that ZCNET can decode packets at lower SNRs than LoRa at similar or higher PHY data rates.

5.4 Link Capacity Comparison with LoRa

Another set of comparison is on the link level capacity with multiple simultaneous packets.

5.4.1 Simulation Setup:

For ZCNET, time-domain signals were generated exactly as what would have been received in the real-world. That is, randomly generated packets were passed to the ETU model, scaled, and added to the background noise starting at randomly selected ZCNET SYNC epochs. To be more specific, the duration of each test was 2000 time symbols. A certain number of packets, such as 1000, were randomly assigned to each root channel to be started at random SYNC epochs. The SNR of a packet was randomly selected in [B, B+α] dB, where B and a are referred to as the base SNR and the power difference, respectively. The power difference models errors in transmission power control, which is a necessary procedure in most wireless networks and should limit the disparity of received signal power to a reasonable level. A difference of 20 dB should be a fairly large error.

5.4.2 Under the Most Challenging Channels:

One interesting setting is when all nodes are under the most challenging channel conditions and must use the most robust MCS. For ZCNET, it would be MCS A, and for LoRa, SF 12. Note that this may be quite close to the reality in certain cases, as LPWAN may cover a large area and the majority of the nodes may be far from the AP. The base SNR was −20 dB, 2 dB higher than the single packet decoding threshold of ZCNET MCS A, to cope with the interference from other root channels.

Figure 7:
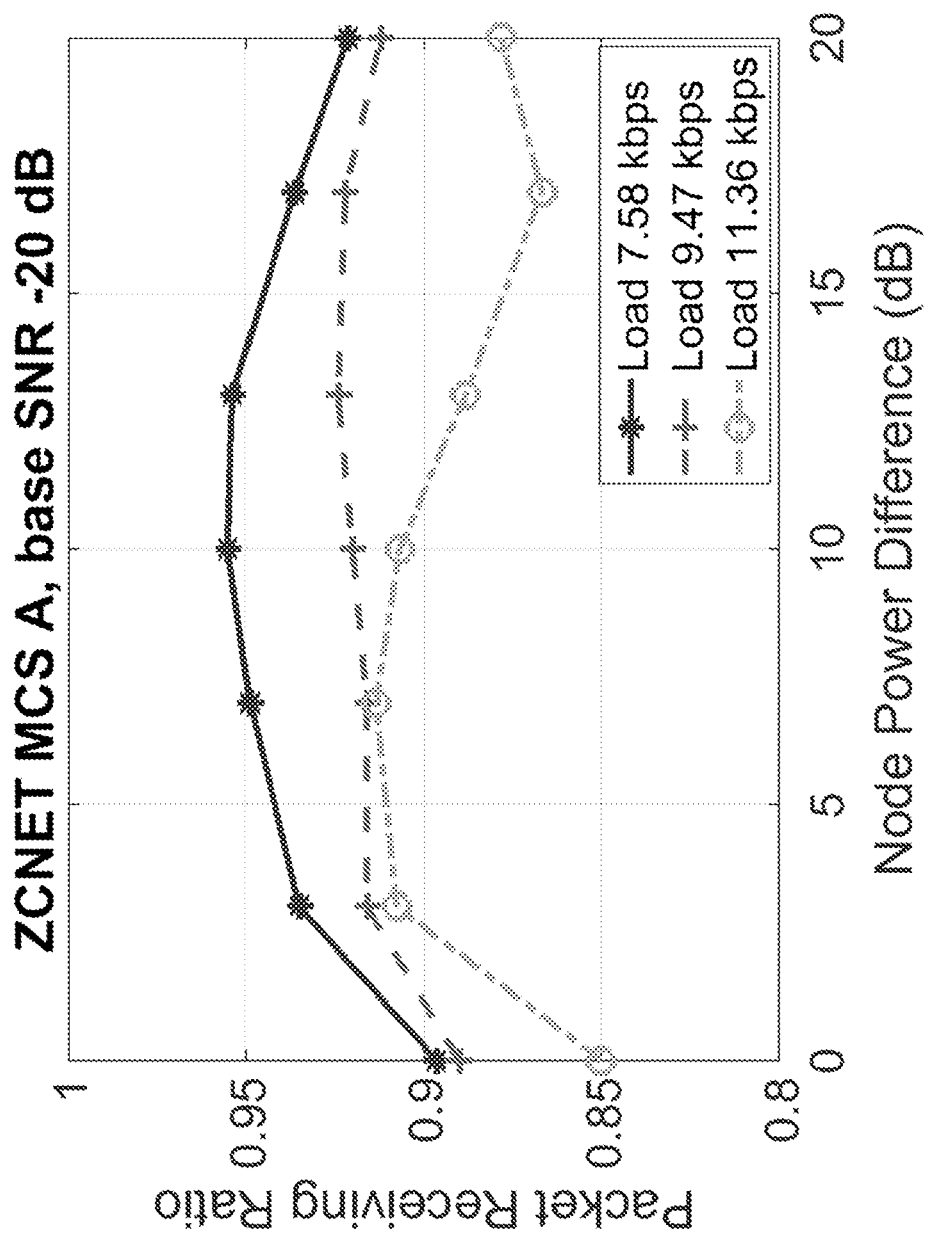
FIG. 7 illustrates PRR of example ZCNET MCS A packets.

FIG. 7 shows the PRR of ZCNET MCS A packets. For simplicity, in the figure, instead of the total number of packets, the traffic load is shown as the link layer load measured in kbps. For example, 1000 packets in 2000 ZCNET time symbols is 9.47 kbps, because each time symbol is 8.448 ms and each packet contains 160 link layer bits. It can be seen that the regardless of the power difference, the PRR is always above or very close to 0.9 for load 9.47 kbps or lower. Therefore, ZCNET MCS A achieves a link layer throughput of at least 8.42 kbps even with a power difference of 20 dB. In contrast, the link layer throughput with LoRa SF 12 is capped at its PHY data rate of 0.209 kbps. The capacity gain is therefore over 40 times. Note that the actual gain can be even higher, due to the ALOHA MAC in LoRa WAN, which may lead to large loss due to collisions.

Figure 8:
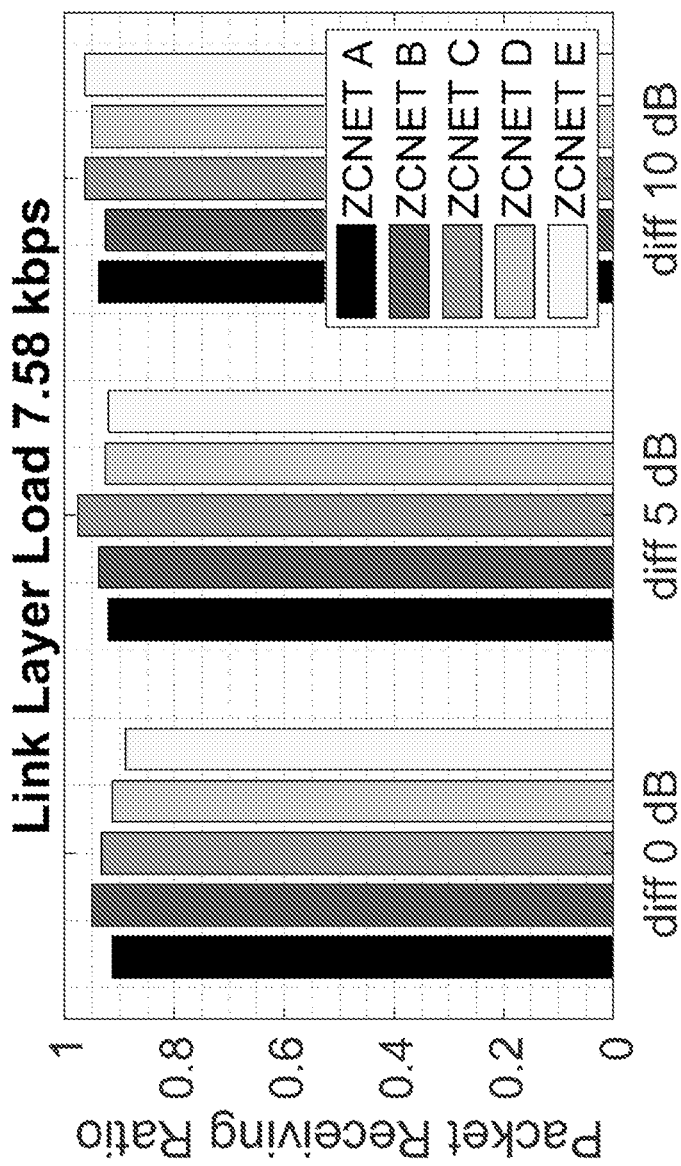
FIG. 8 illustrates PRRs when the load is 7.58 kbps for example ZCNET MCSs.

5.4.3 Mixed Load with Multiple MCSs:

Another setting is with mixed load, i.e., when packets on all MCSs are transmitted. Similar to earlier tests, all packets were generated with random root channels and added to the time-domain signal starting at random SYNC epochs. Packets on MCSs A, B, C, D, E were scaled to random SNRs, with bases SNRs −20, −17, −14, −10, −7 dB, respectively, and the same power difference, which was 0, 5, or 10 dB in different sets of tests. FIG. 8 shows the PRRs when the load is 7.58 kbps. It can be seen that the PRRs of all MCSs are close to or above 0.9, i.e., in 2000 time symbols, 160 packets were offered for each MCS, even when the power difference was 10 dB. Therefore, ZCNET will likely be able to support packet transmissions in realistic scenarios. Note that the PRRs are lower with mixed MCSs than only with MCS A, because higher MCSs introduce more interference.

Figure 9:
FIG. 9 illustrates results of LoRa with mixed load.

Similar tests were conducted for LoRa. Signals of packets with SF 7 to SF 12 were scaled to certain SNRs and added to the time-domain signal at random times, where the base SNRs were −6, −7, −10, −13, −16, −20 dB, respectively, and the power difference is 0 dB, which is preferred by LoRa. Note that the starting times of the packets were random, because LoRaWAN adopts the ALOHA protocol. Also note that packets transmitted simultaneously with different SFs may be received correctly in some cases, although the signals on different SFs are not orthogonal [16]. To the benefit of LoRa, packet detection and synchronization were made perfect by passing the actual starting time of packets to the decoding program. FIG. 9 shows the results, where it can be seen that at the load of 7.58 kbps, i.e., 133 packets with each SF within the same amount of time as the ZCNET tests, LoRa basically fails, especially for the higher SF. For example, the PRR of SF 12 is below 1%. This is because most packets were under heavy collision, as the time was enough for transmitting only 13 packets with SF 12. Even for lower SFs, the PRR suffers greatly due to collisions with packets with the same SF and the interference from other SFs. Only when the load is reduced by 100 times, the PRRs of all SFs rise above 0.8.

Section 6: Implementation Embodiment Examples

ZCNET can be used with any frequency(ies).

Herein the term "ZCNET" is used to indicate an embodiment of some or all of the ZCNET features described herein.

A ZCNET node can include a bi-directional data transmission interface or only uplink transmission circuitry. The node can receive wireless communication resource information from an AP to know which resources to use for transmission or reception processing or both. A ZCNET AP can send a beacon signal to the node. The beacon signal can be used by the node to obtain, estimate, or correct a frequency/time error for use in modulation and demodulation operations. Alternatively, the node can be preconfigured with information of what communication resources are available for its use. ZCNET embodiments can be implemented with public or private networks.

Applications that could benefit from the solutions ZCNET embodiments provide include any application that requires low power and long range wireless connectivity, for example, IoT devices. Example applications include asset management, smart cities, smart homes, smart buildings, smart agriculture, inventory management, smart security, data loggers, smart parking garages, smart utility metering, building automation and security, tracking livestock, soil moisture sensing, smoke alarms, water leak detectors, home security, and others.

Figure 10:
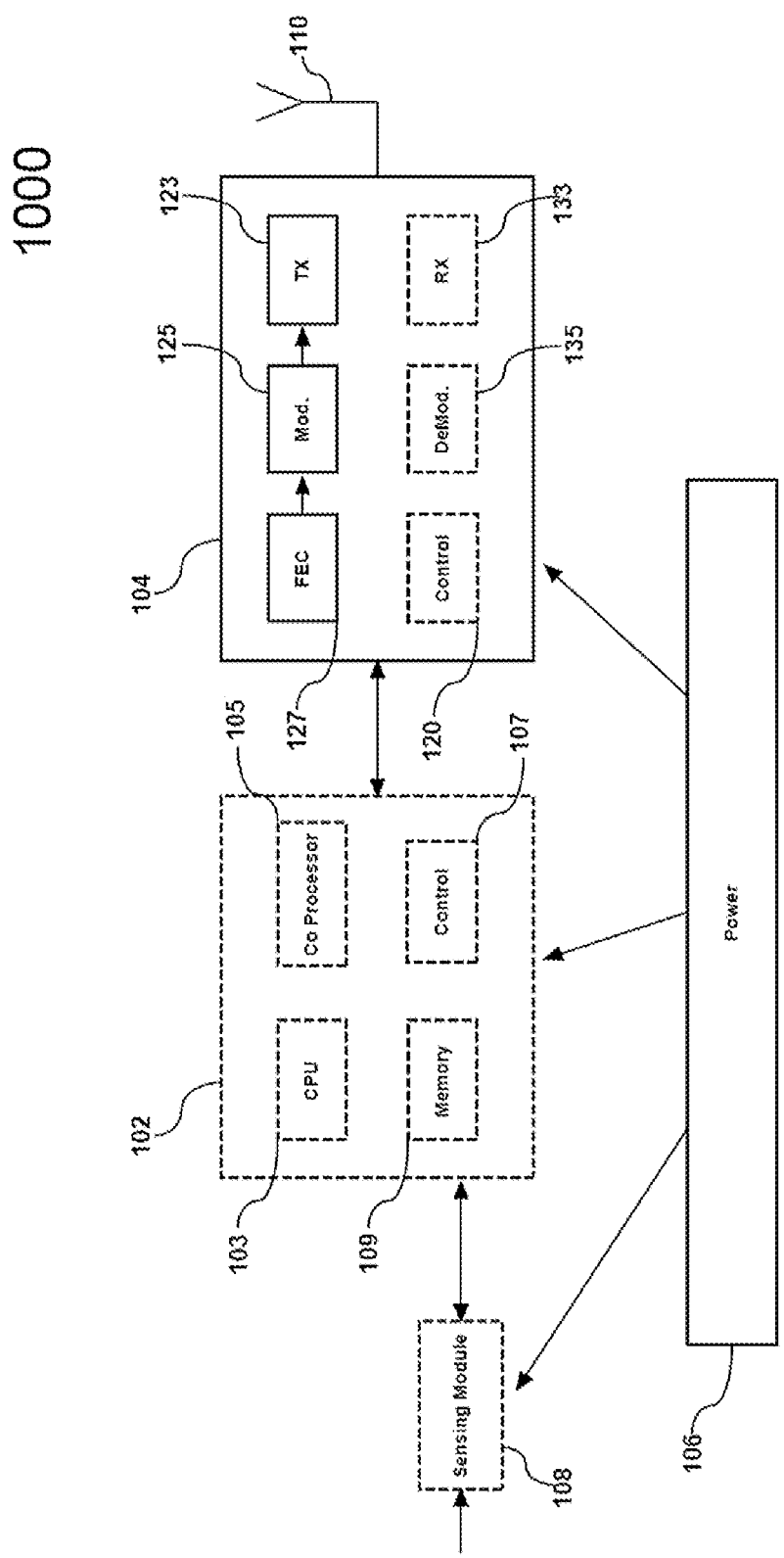
FIG. 10 illustrates an embodiment of component architecture of a node in accordance with an embodiment of ZCNET.

FIG. 10 illustrates an embodiment of component architecture of a node 1000 or other wireless communication device with less components, such as ZCNET circuitry in accordance with an embodiment of ZCNET. ZCNET circuitry can be implemented on a flexible and programmable single-chip solution or with more customized circuitry. A ZCNET node can include communicatively coupled components, such as process control circuitry 102, processor 103, co-processor(s) 105, control circuitry 107, memory 109, transmitter/receiver circuitry or other type of wireless communication interface 104, power supply and circuitry 106, sensing circuitry 108, antenna 110, etc. The memory can be RAM or ROM and stores a program executed by the controller 105 and, or, controller 120. A ZCNET configured transceiver circuitry 108 can include separate functional circuitry such as ADC circuitry, DAC circuitry, multi-protocol circuitry, communication control circuitry, encoding circuitry, framing circuitry, etc. or can combine such functional circuitry. Not every component is required for example when the goal is providing a less costly component.

Optional components are indicated in FIG. 10 with dashed lines. In an embodiment, ZCNET transmitter circuitry can include FEC circuitry 127, modulator circuitry 125, and transmitter circuitry 104. In an alternative embodiment, ZCNET transmitter circuitry can include FEC circuitry 127, modulator circuitry 125, and transmitter circuitry 104, and a ZCNET controller 120. ZCNET controller 120 can be a controller or coder circuitry or other data transmission control circuitry. ZCNET transmitter circuitry includes and circuitry combination capable of performing processing described herein, including the process described in FIG. 12. In an embodiment, a less expensive node device can be implemented to achieve less complex functionality, such as only including the transmitter circuitry of the transmitter/receiver circuitry 104 to be able to only transmit uplink information. In an embodiment, ZCNET transmitter/receiver circuitry 104 or radio interface circuitry can include a ZCNET transmitter controller circuitry 120, ZCNET modulator circuitry 125, and FEC circuitry 127, ZCNET receiver circuitry 133, ZCNET demodulator circuitry 135, etc., in accordance with embodiments of ZCNET described herein.

ZCNET controller 105 and/or 120 can be, for example, any kind of processor, such as a micro-processor, CPU, or a digital signal processor (DSP) that operates various functions in accordance with embodiments of ZCNET and can include other circuitry capable of operating functions of a node.

Figure 11:
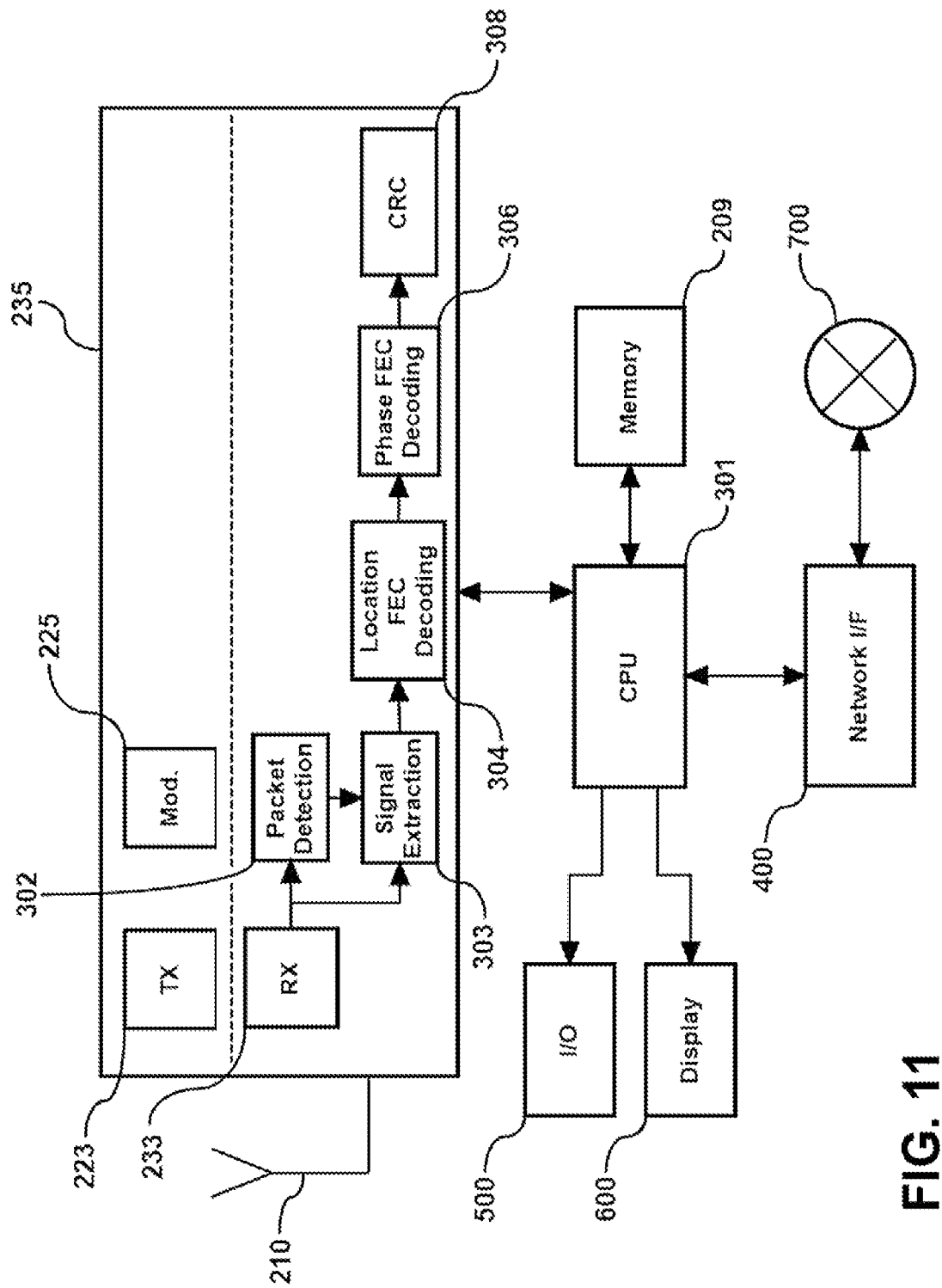
FIG. 11 illustrates an embodiment of component architecture of an access point (AP) in accordance with an embodiment of ZCNET.

FIG. 11 illustrates an embodiment of component architecture of an access point (AP) or other wireless communication device with less components, such as ZCNET receiver circuitry (e.g., receiver circuitry 233, packet detection circuitry 302, Location FEC decoding circuitry 304, Phase FEC decoding circuitry, and CRC circuitry 308), in accordance with an embodiment of ZCNET. A ZCNET AP can include communicatively coupled components capable of providing ZCNET functionality, as described herein for example the example procedure described in FIG. 13, or also including greater AP node functionality. For example, ZCNET circuitry can include additional components, such as a controller 301 or other data transmission control circuitry, a memory 209, an input device 500, a display device 600, a network interface 400, a wireless communication interface 204, an antenna 210, transmission circuitry 223, modulator circuitry 225, reception circuitry 233, demodulation circuitry 235, packet detection circuitry 302, signal extraction circuitry 303, Location FEC decoding circuitry 304, Phase FEC decoding circuitry 306, and CRC circuitry 308. ZCNET circuitry can be integrated into a ZCNET AP device 1100.

The controller 205 can be, for example, any kind of processor, such as a micro-processor, CPU, or a digital signal processor (DSP) that operates various functions in accordance with embodiments of ZCNET and can include other functions (for example, access limitation, routing, encryption, a fire wall, and log management) of the Internet Protocol (IP) layer and higher layers of the wireless access point 200. The memory 209 includes RAM and ROM and stores a program executed by the controller 205 and various kinds of control data (for example, a terminal list, a routing table, an encryption key, security settings, and a log) processed by an access point device.

The input device 500 includes, for example, a button or a switch, and receives operation performed by a user. The display device 600 includes an LED lamp and displays an operation status of the wireless access point 200.

The network interface 400 is a wired communication interface that connects the wireless access point 200 with a wired or wireless communication network 700. The network interface 400 may include a plurality of connection terminals. The wired or wireless communication network 700 may be a LPWAN, or a LAN such as Ethernet (registered trademark) or may be a wide area network (WAN).

The wireless communication interface 204 supplies wireless connection to one or more nearby terminal node(s) 100, acting as an access point. The wireless communication interface 204 can typically include a baseband processor, an RF circuit, and a power amplifier. The wireless communication interface 204 may be a one-chip module in which memory storing a communication control program, a processor executing the program, and relevant circuits are integrated. The antenna 210 can include an antenna switch to switch a connection destination of the antenna 210 among a plurality of circuits included in the wireless communication interface 204. The antenna 210 includes one antenna element or a plurality of antenna elements and is used to transmit and receive a wireless signal through the wireless communication interface 204.

Figure 12:
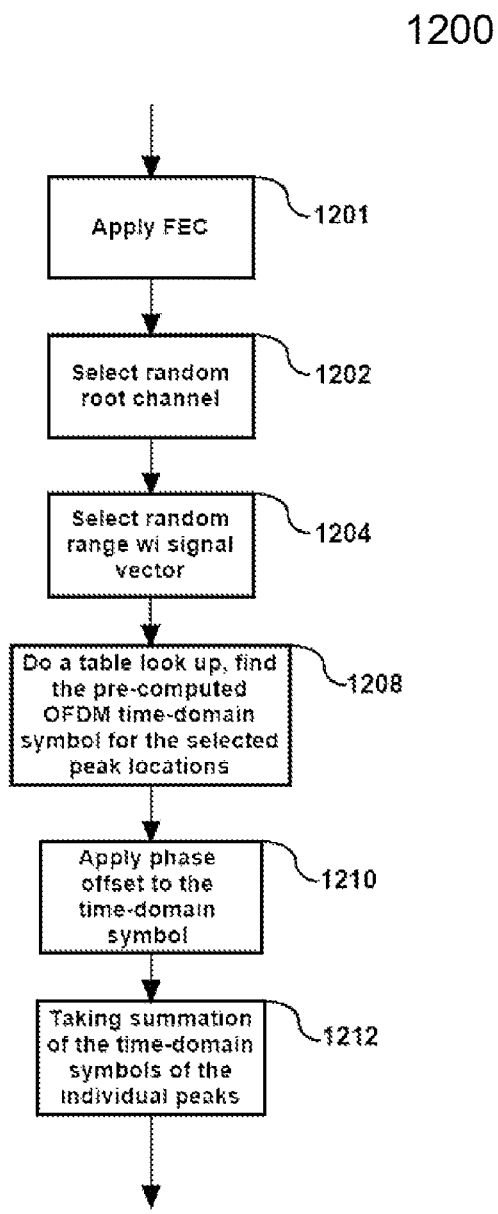
FIG. 12 illustrates a flow diagram of a procedure which can be executed by an embodiment of ZCNET node.

FIG. 12 illustrates a flow diagram of a ZCNET data modulation and transmission procedure 1200, which can be executed by an embodiment of ZCNET circuitry. For example, ZCNET circuitry applies FEC to data to be transmitted (S1201), selects a random root channel (S1202), and selects a random range (S1204) within the signal vector for the transmission of the packet. The packet includes, or consists of, the preamble, the PHY header, and the data. At the PHY layer, the node can transmit one or multiple peaks in each time symbol.

The data is modulated by changing the location and the phase of the peaks. For example, a node can modulate the data according to a root ZC sequence $A_r$ where r denotes the root index. The circuitry performs a lookup to find pre-computed OFDM time-domain symbol for the selected peak locations (S1208). The circuitry applies phase offset to the time-domain symbol (S1210.) The circuitry takes the summation of the time-domain symbols of the individual peaks (S1212.)

The process can cyclically shift root ZC sequence $\Lambda r$ by h locations to produce $\Lambda_h^r$. When the node determines to transmit $\Lambda_h^r$ it generates an ODFDM symbol, in which L subcarriers are used to transmit FFT $(\Lambda_h^r)$. This step is optional in its being done in real time. The OFDM symbols can be precalculated and stored before this step to reduce complexity of the node. The node can apply a selected modulation, e.g., MCS A, to change the location and phase of the peaks. The modulation can be low in complexity, by storing the pre-computed time-domain waveforms of each peak. For example, the node first applies FEC code to convert the data into codewords. The node then randomly selects a root channel and a range inside the signal vector. The node then determines the peak locations and peak phases according to the codeword, the range, and root channel. For each peak, the node finds its waveform from the pre-computed set of waveforms, then rotate the phase according the codeword. The node then takes the summation of the waveforms of all peaks in one time symbol as the signal to be transmitted for this time symbol.

Figure 13:
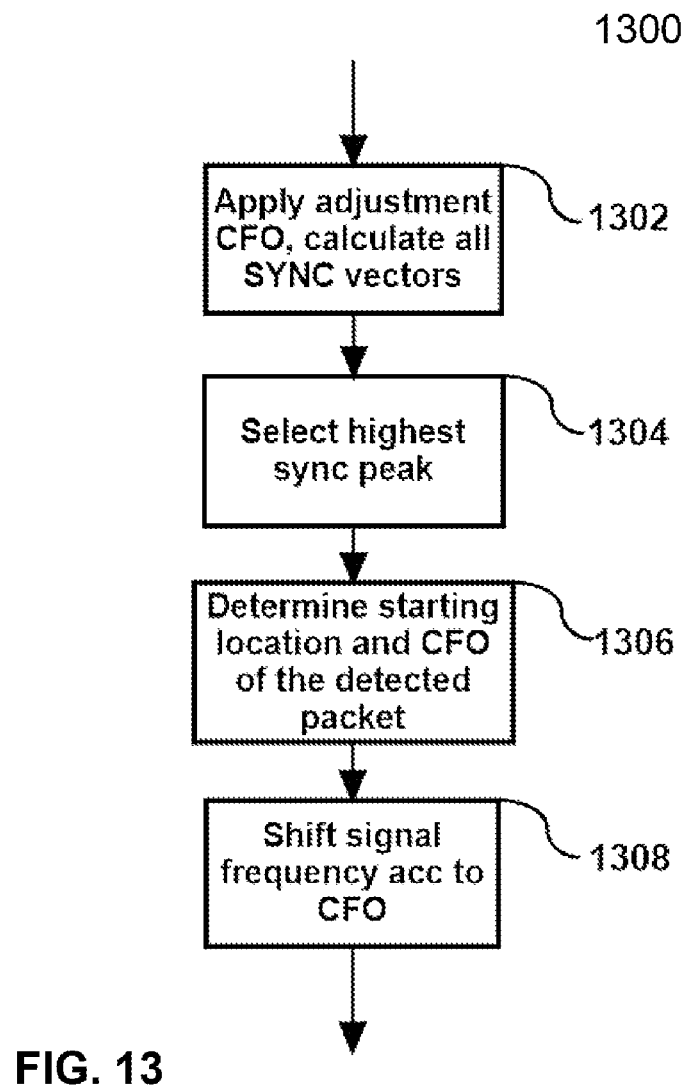
FIG. 13 illustrates a flow diagram of a procedure which can be executed by an embodiment of ZCNET AP.

FIG. 13 illustrates a flow diagram of a data reception procedure 1300 which can be executed by an embodiment of ZCNET AP. ZCNET AP can have offset information preconfigured. With the offset information the AP can detect a packet by applying the adjustment CFO and shifting the signal vectors and use the summation as the SYNC vectors (S1302) and selecting the highest peak (S1304). The AP can determine the starting location and the CFO of the detected packet (S1306). As the preamble peaks of the same packet should be aligned, they can produce a higher peak. The AP determines the location of the peak and assigns it as the beginning of the range. The AP can estimate the carrier frequency offset as it is the offset which produce the additive effect of the peaks, otherwise cancellation will occur. The AP shifts the signal frequency according to the CFO to be able to decode packets (S1308).

ZCNET AP can have preamble peak offset information preconfigured to detect a packet. In the preamble, each time symbols contains one peak at a location according to the offset from the starting location of the range selected by the node. The AP can then use the offset information to shift the signal vectors of the preamble according to the offset values and add the signal vectors up. As the preamble peaks of the same packet should be aligned, they can produce a higher peak. The AP determines the location of the peak and use it as the beginning of the range. The AP can estimate the carrier frequency offset as it is the offset which produce the additive effect of the peaks, otherwise cancellation will occur.

In other words, the main challenge in ZCNET is to detect the packets and learn the key parameters of the packets. Because the nodes transmit packets completely randomly, this minimizes the node complexity, however the AP will have to comb through the signal from tens of nodes to find new packets and to learn the range of the new packet and the carrier frequency offset.

In other words, A node device according to claim 1, wherein the transmitted peaks are determined by taking one out of four candidate peak locations, thereby carrying two raw bits. The phase of the peak can be chosen from four options, thereby also carrying two raw bits.

The AP solution includes a novel design of packet preamble, which consists of consecutive time symbols, e.g., 16 consecutive time symbols, each with a peak at a location with a certain offset to the starting location of the range. The offset values are pseudo random numbers known to the AP. The AP shifts the signal vectors of the preamble according to the offset values and adds them up. The preamble peaks of the same packet will be aligned and produce a much higher peak, a clear sign of a new packet. The location of the peak is the beginning of the range. The carrier frequency offset can be estimation because only the correct estimation, when applied, will result in constructive addition of the peaks. With incorrect estimations, the peaks will cancel each other.

In an embodiment of a ZCNET AP, an additional procedure can be used to improve reconstruction of the received signals. In other words, a SIMIC can carve out the points near the strong peaks to reconstruct the time-domain signal. The time domain signal can be subtracted from the received original signal. The interference of the strong peak on other root channels can therefore be removed. This significantly improves the performance of weak nodes in the presence of strong nodes.

In conclusion, the following table summarizes some example advantages of ZCNET along with some of the most well-known LPWAN technologies, where it can be seen that ZCNET achieves much higher network capacity per Hz use of bandwidth, as well as higher Physical (PHY) layer data rates for individual nodes in most cases.

TABLE 3

Comparison of LPWAN Technologies with ZCNET

| | Bandwidth (kHz) | Functioning SNR or Communication Distance | PHY Rate (kbps) | MAC | Efficiency (b/s/kHz) |
|---|---|---|---|---|---|
| LoRa | 125 | −20 dB | 0.209 | ALOHA | less than 1.67 |
| Sigfox | 192 | similar to LoRa | 0.033 | ALOHA | less than 10.4 |
| RPMA | 1,000 | similar to LoRa | 0.06 | ALOHA | less than 18 |
| Weighless | 100 | shorter distance than LoRa | 0.625 | mixed | less than 25 |
| ZCNET | 120 | −20 dB, similar to LoRa | 0.237 | ALOHA | more than 42.5 |

The following are some details and explanations about the comparison:

The performance of LoRa was obtained by simulation. The performance of ZCNET is obtained with simulation. The capacity values of other technologies are based on the official documents of the companies and are fairly loose upper bounds.

The network capacity measures the payload received by the Access Point (AP), excluding overhead such as the Medium Access Control (MAC) header and Cyclic Redundancy Check (CRC). In the evaluation, the payload size is only 12 bytes per packet for ZCNET. Larger payload will lead to higher capacity.

The comparison is for more challenging wireless channel conditions, under which the most robust Modulation and Coding Scheme (MCS) should be used. As an LPWAN is expected to cover a large area, most nodes will likely be under challenging channel conditions.

Only Weightless has a higher physical layer data rate than ZCNET, which is however at the cost of a shorter communication distance. The SNR threshold of Weightless is −17.5 dB in flat channels, 2.5 dB higher than ZCNET, even when ZCNET was evaluated under more challenging channels. Most LPWAN technologies, including ZCNET, use an ALOHA-style MAC. Weightless, on the other hand, prefers scheduled uplink access, although also offers contended uplink access as an option. The scheduled access will lead to additional complexity, overhead, and latency.

Means plus function and computer program product versions of claim coverage as supported by the title and features described herein are intended to be available for coverage in this or subsequent applications.

Modifications, additions, or omissions can be made to the systems, apparatuses, and methods described herein without departing from the scope of the disclosure. For example, the components of the systems and apparatuses can be integrated or separated. Moreover, the operations of the systems and apparatuses disclosed herein can be performed by more, fewer, or other components and the methods described can include more, fewer, or other steps. Additionally, steps can be performed in any suitable order. As used in this document, "each" refers to each member of a set or each member of a subset of a set.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Obviously, numerous modifications and variations of the present invention are possible in light of the descriptions herein. It is therefore to be understood that within the scope of the appended claims, the invention can be practiced otherwise than as specifically described herein.

In an embodiment, a node device comprising circuitry configured to: determine a transmission procedure without transmission instruction from an access point and without consideration of a channel of a frequency band transmission of at least one other node that is communicatively coupled to the access point, wherein the at least one other node and the node can transmit to the access point using the same frequency band, the frequency band having a plurality of available parallel root channels associated to it, wherein the node and the other node can simultaneously transmit on the same parallel root channel of the same frequency band if each node picked a non-overlapping range within the same parallel root channel; wherein determining the transmission procedure includes: randomly selecting a root channel from the plurality of available root channels of the frequency band; randomly selecting a range and in the range, of the selected root channel for transmission of a packet; and sending the packet by transmitting peaks at the selected locations of a signal vector at the root channel.

The invention claimed is:

1. An access point device, comprising:
circuitry configured to:
 transmit to a node device using a frequency band having a plurality of available parallel root channels associated to the frequency band;
 randomly select a root channel from the plurality of available parallel root channels;
 randomly select a number of consecutive points of a signal vector from the selected root channel location for transmission of a packet; and
 send the packet by transmitting peaks, at the selected root channel location, that are a sum of signal vectors for peak locations.

2. The access point device of claim 1, wherein the circuitry is further configured to determine the peak locations according to a codeword, a range inside the signal vector, and the root channel.

3. The access point device of claim 1, wherein the circuitry is further configured to transmit a beacon packet.

4. The access point device of claim 1, wherein a number of the plurality of available parallel root channels is eight.

5. The access point device of claim 1, wherein:
the circuitry is further configured to modulate data by transmitting one Zadoff-Chu sequence that is derived from one of eight root sequences; and
each root sequence generates a root channel.

6. The access point device of claim 1, wherein:
the circuitry is further configured to modulate data by transmitting a plurality of Zadoff-Chu sequences;
each Zadoff-Chu sequence is derived from one of eight root sequences; and
each root sequence generates a root channel.

7. The access point device of claim 1, wherein the circuitry is further configured to transmit a transmitted peak at one of four candidate peak locations.

8. The access point device of claim 7, wherein the circuitry is further configured to transmit the transmitted peak at one out of four candidate phase values.

9. The access point device of claim 1, wherein the circuitry is further configured to determine locations and phases of the transmitted peaks according to codewords.

10. The access point device of claim 1, wherein:
the packet includes a preamble including consecutive time symbols; and
each consecutive time symbol has a peak at a location from an offset value to a starting location of a subset range.

11. The access point device of claim 10, wherein the offset value is calculated according to a mathematical formula known to both the access point device and the node device.

12. The access point device according to claim 10, wherein the peaks of the consecutive time symbols of the preamble notify node device signal detection circuitry of the sending of the packet by producing an alignment at node device signal detection circuitry indicating a higher peak relative to other possible signals.

13. A node device, comprising:
control circuitry configured to:
   detect a signal in a frequency band having a plurality of available parallel root channels associated to the frequency band; wherein:
      the signal includes a root channel from the plurality of available root channels of the frequency band; and
      the signal is in a subset range in a range of a signal vector of the root channel; and
   receive a packet via the signal by detecting peaks at a selected root channel location, wherein the detecting the peaks comprises detecting the peaks by receiving a signal vector at the selected root channel location.

14. The node device of claim 13, wherein the detected peaks are at one out of four candidate peak locations.

15. The node device of claim 14, wherein a phase of the detected peaks is at one of four candidate phase values.

16. The node device of claim 15, wherein:
   the packet includes a preamble including consecutive time symbols; and
   each consecutive time symbol has a peak at a location from an offset value to a starting location of a subset range.

17. The node device of claim 16, wherein the offset value is a number calculated according to a mathematical formula known to the node device.

18. The node device of claim 17, wherein the peaks of the consecutive time symbols of the preamble produce an alignment at node device detection circuitry to indicate a higher peak relative to other signals in the frequency band, thereby notifying the signal detection circuitry of the detection of the packet.

19. The node device of claim 13, wherein the control circuitry is further configured to use a simple interference cancellation procedure to improve packet reception.

20. A data reception procedure, comprising:
   detecting a signal in a frequency band having a plurality of available parallel root channels associated to the frequency band, wherein:
      the signal includes a root channel from the plurality of available root channels; and
      the signal is in a subset range in a range of a signal vector of the root channel; and
   receiving a packet via the signal by detecting peaks at a selected root channel location, wherein the detecting the peaks comprises detecting the peaks by receiving a signal vector at the selected root channel location.

* * * * *